(12) United States Patent
Moseley et al.

(10) Patent No.: US 12,453,743 B2
(45) Date of Patent: Oct. 28, 2025

(54) MESENCHYMAL STEM CELL (MSC) GROWTH FACTOR AND EXTRACELLULAR VESICLE PREPARATION IN FROZEN OR POWDERED FORM AND METHODS OF USE

(71) Applicant: DIRECT BIOLOGICS, LLC, Austin, TX (US)

(72) Inventors: Timothy Alexander Moseley, Fallbrook, CA (US); Kenneth Allen Pettine, Fort Collins, CO (US)

(73) Assignee: DIRECT BIOLOGICS, LLC, Austin, TX (US)

( * ) Notice: Subject to any disclaimer, the term of this patent is extended or adjusted under 35 U.S.C. 154(b) by 363 days.

(21) Appl. No.: 17/059,874

(22) PCT Filed: Apr. 9, 2019

(86) PCT No.: PCT/US2019/026595
§ 371 (c)(1),
(2) Date: Nov. 30, 2020

(87) PCT Pub. No.: WO2019/231562
PCT Pub. Date: Dec. 5, 2019

(65) Prior Publication Data
US 2021/0196759 A1    Jul. 1, 2021

Related U.S. Application Data

(60) Provisional application No. 62/698,673, filed on Jul. 16, 2018, provisional application No. 62/688,012, filed on Jun. 21, 2018, provisional application No. 62/681,172, filed on Jun. 6, 2018, provisional application No. 62/677,744, filed on May 30, 2018.

(51) Int. Cl.
| | | |
|---|---|---|
| A61K 35/28 | (2015.01) | |
| A61K 38/00 | (2006.01) | |
| C07K 14/475 | (2006.01) | |
| C12N 5/0775 | (2010.01) | |

(52) U.S. Cl.
CPC ............ *A61K 35/28* (2013.01); *C07K 14/475* (2013.01); *C12N 5/0668* (2013.01); *A61K 38/00* (2013.01); *C12N 2320/30* (2013.01); *C12N 2500/02* (2013.01)

(58) Field of Classification Search
CPC ...... A61K 35/28; A61K 38/00; C07K 14/475; C12N 5/0668; C12N 2320/30; C12N 2500/02
See application file for complete search history.

(56) References Cited

U.S. PATENT DOCUMENTS

| | | |
|---|---|---|
| 3,610,795 A | 10/1971 | Antoine et al. |
| 4,897,355 A | 1/1990 | Eppstein et al. |
| 5,135,917 A | 8/1992 | Burch et al. |
| 5,712,163 A * | 1/1998 | Parenteau ............ C12N 5/0075 435/405 |
| 6,410,588 B1 | 6/2002 | Feldmann et al. |
| 7,029,666 B2 | 4/2006 | Bruder et al. |
| 8,021,882 B2 | 9/2011 | Johnstone et al. |
| 8,057,789 B2 | 11/2011 | Hariri |
| 8,372,797 B2 | 2/2013 | Ichim |
| 8,703,710 B2 | 4/2014 | Dzau et al. |
| 8,778,416 B2 | 7/2014 | Cohen |
| 9,408,874 B2 | 8/2016 | Pettine |
| 9,744,130 B2 | 8/2017 | Lipp et al. |
| 9,856,455 B2 | 1/2018 | March et al. |
| 9,980,984 B2 | 5/2018 | Pettine |
| 10,456,425 B2 | 10/2019 | Herrera Sanchez et al. |
| 10,744,160 B2 | 8/2020 | Sokolov et al. |
| 10,881,693 B2 | 1/2021 | Alford |
| 11,376,283 B2 | 7/2022 | Sokolov et al. |
| 11,529,306 B2 | 12/2022 | Yi et al. |
| 2004/0248970 A1 | 12/2004 | Webster et al. |
| 2007/0254827 A1 | 11/2007 | Sutton et al. |
| 2008/0241112 A1 | 10/2008 | Westenfelder |
| 2009/0177487 A1 | 7/2009 | Eerkes |
| 2010/0178274 A1 | 7/2010 | Sekiya et al. |
| 2011/0003008 A1 | 1/2011 | Lim |
| 2011/0014251 A1 | 1/2011 | Ray |
| 2012/0064049 A1 | 3/2012 | Hunziker |
| 2013/0115198 A1 | 5/2013 | Hoffmann et al. |
| 2013/0129688 A1 | 5/2013 | Brenner et al. |
| 2013/0195899 A1 | 8/2013 | Ichim et al. |
| 2013/0210725 A1 | 8/2013 | Naughton et al. |

(Continued)

FOREIGN PATENT DOCUMENTS

| | | |
|---|---|---|
| AU | 2004203482 A1 | 8/2004 |
| CA | 2880404 A1 | 2/2014 |
| CN | 104622904 A | 5/2015 |
| CN | 108042572 A | 5/2018 |
| CN | 108498452 A | 9/2018 |
| CN | 111150743 A | 5/2020 |
| CN | 109718392 B | 11/2021 |
| EP | 2582791 A2 | 4/2013 |
| EP | 2687219 A1 | 1/2014 |
| EP | 2296672 B1 | 9/2015 |
| EP | 2683389 B1 | 5/2017 |
| EP | 2877187 B1 | 6/2019 |
| EP | 3492585 A1 | 6/2019 |
| EP | 3668319 A1 | 6/2020 |
| EP | 3672606 A1 | 7/2020 |

(Continued)

OTHER PUBLICATIONS

Kondo, A., and Osawa, T., "Establishment of an Extracellular Acidic pH Culture System," J Vis Exp 129: e56660. doi: 10.3791/56660. (Year: 2017).*

(Continued)

*Primary Examiner* — Tracy Vivlemore
*Assistant Examiner* — Eric J Rogers
(74) *Attorney, Agent, or Firm* — Wilson Sonsini Goodrich & Rosati

(57) ABSTRACT

Disclosed are mesenchymal stem cell growth factor compositions and methods of their use to treat skin disorder, alleviate the effects of aging, treat wounds, orthopedic disorders, sexual dysfunction and/or reduce inflammation.

10 Claims, 2 Drawing Sheets

(56) References Cited

U.S. PATENT DOCUMENTS

Figure 1:
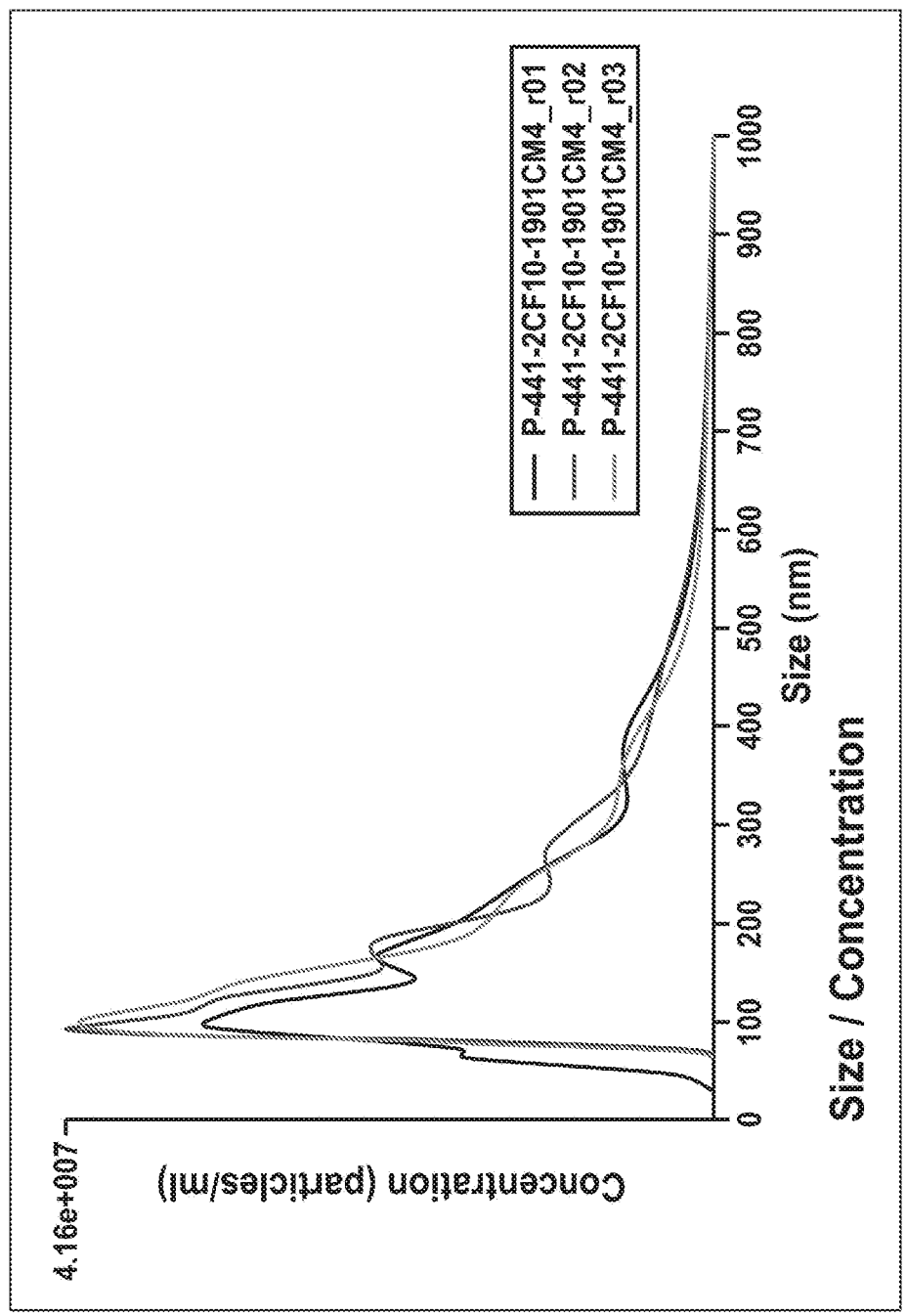

| | | |
|---|---|---|
| 2013/0236427 A1 | 9/2013 | Pernock |
| 2014/0004601 A1 | 1/2014 | Lim |
| 2014/0065240 A1 | 3/2014 | Mitsialis et al. |
| 2014/0220053 A1 | 8/2014 | Muraca et al. |
| 2015/0086513 A1 | 3/2015 | Savkovic et al. |
| 2015/0125950 A1 | 5/2015 | Lim et al. |
| 2016/0113967 A1 | 4/2016 | Hedrick et al. |
| 2016/0263160 A1 | 9/2016 | Nolta et al. |
| 2016/0281045 A1 | 9/2016 | McCALL et al. |
| 2017/0051359 A1 | 2/2017 | Pegtel et al. |
| 2017/0055561 A1 | 3/2017 | Naughton et al. |
| 2017/0107488 A1 | 4/2017 | Petcavich |
| 2017/0166864 A1 | 6/2017 | Kihm et al. |
| 2017/0189449 A1 | 7/2017 | Lim |
| 2017/0304368 A1 | 10/2017 | Marban et al. |
| 2018/0055891 A1 | 3/2018 | Zhao |
| 2018/0100149 A1 | 4/2018 | Marbán et al. |
| 2018/0214489 A1 | 8/2018 | Riordan |
| 2018/0242590 A1* | 8/2018 | Friedman ............... A01N 63/50 |
| 2018/0264043 A1 | 9/2018 | Pettine et al. |
| 2018/0282762 A1 | 10/2018 | Gori |
| 2018/0318356 A1 | 11/2018 | Pettine et al. |
| 2018/0338866 A1 | 11/2018 | Kharazmi |
| 2019/0000886 A1 | 1/2019 | Ross |
| 2019/0015331 A1 | 1/2019 | Elliman et al. |
| 2019/0046576 A1 | 2/2019 | Gangaraju et al. |
| 2019/0133922 A1 | 5/2019 | Kang et al. |
| 2019/0195863 A1 | 6/2019 | Brivanlou et al. |
| 2019/0209665 A1 | 7/2019 | Pluchino et al. |
| 2019/0269739 A1 | 9/2019 | Brodie et al. |
| 2019/0328792 A1 | 10/2019 | Traweger et al. |
| 2019/0330594 A1 | 10/2019 | You et al. |
| 2020/0030253 A1 | 1/2020 | Kharazmi |
| 2020/0316226 A1 | 10/2020 | Marban et al. |
| 2020/0325452 A1 | 10/2020 | Alford |
| 2021/0000882 A1 | 1/2021 | Coronado |
| 2021/0038652 A1 | 2/2021 | Naughton et al. |
| 2021/0128627 A1 | 5/2021 | Aricha et al. |
| 2021/0169939 A1 | 6/2021 | Ilagan et al. |
| 2021/0228643 A1 | 7/2021 | Bobis-Wozowicz et al. |
| 2021/0254056 A1 | 8/2021 | Liu et al. |
| 2021/0267892 A1 | 9/2021 | Machluf et al. |
| 2021/0299036 A1 | 9/2021 | Naughton |
| 2021/0348114 A1 | 11/2021 | Hudson et al. |
| 2021/0363525 A1 | 11/2021 | Saetrom et al. |
| 2021/0369617 A1 | 12/2021 | Alford |
| 2022/0000932 A1 | 1/2022 | Zhang et al. |
| 2022/0079987 A1 | 3/2022 | Pettine |
| 2022/0079990 A1 | 3/2022 | Moseley et al. |
| 2022/0096560 A1 | 3/2022 | Mitsialis et al. |
| 2022/0110970 A1 | 4/2022 | Jhan et al. |
| 2022/0125848 A1 | 4/2022 | Pettine et al. |
| 2022/0136011 A1 | 5/2022 | Kalluri |
| 2022/0136053 A1 | 5/2022 | Pettine et al. |
| 2022/0151934 A1 | 5/2022 | Ridall et al. |
| 2022/0152151 A1 | 5/2022 | Pettine |
| 2022/0175843 A1 | 6/2022 | Westenfelder et al. |
| 2022/0195384 A1 | 6/2022 | Kim et al. |
| 2022/0195390 A1 | 6/2022 | Uzan et al. |
| 2022/0202871 A1 | 6/2022 | Pettine |
| 2022/0218755 A1 | 7/2022 | Ilagan et al. |
| 2022/0249699 A1 | 8/2022 | Guild et al. |
| 2022/0257661 A1 | 8/2022 | Pettine et al. |
| 2022/0264872 A1 | 8/2022 | March et al. |
| 2022/0273725 A1 | 9/2022 | Ochiya |
| 2022/0387518 A1 | 12/2022 | Mishra et al. |
| 2023/0000954 A1 | 1/2023 | Alford et al. |
| 2023/0002476 A1 | 1/2023 | Alford et al. |
| 2023/0013636 A1 | 1/2023 | Kalluri |
| 2023/0105667 A1 | 4/2023 | Brodie |
| 2023/0142496 A1 | 5/2023 | Cheng |
| 2023/0143893 A1 | 5/2023 | Bird et al. |
| 2023/0159932 A1 | 5/2023 | Pettine et al. |
| 2023/0172990 A1 | 6/2023 | Ohneda et al. |
| 2023/0181649 A1 | 6/2023 | Hariri et al. |
| 2023/0190818 A1 | 6/2023 | Jurga |
| 2023/0226267 A1 | 7/2023 | Madelska |
| 2023/0248773 A1 | 8/2023 | Jurga |
| 2023/0257712 A1 | 8/2023 | Jurga |
| 2023/0310507 A1 | 10/2023 | Lebovits et al. |
| 2023/0313191 A1 | 10/2023 | Hicok et al. |
| 2025/0186501 A1 | 6/2025 | Pettine et al. |

FOREIGN PATENT DOCUMENTS

| | | | |
|---|---|---|---|
| EP | 3723773 A1 | 10/2020 | |
| EP | 3402489 B1 | 6/2021 | |
| EP | 3920889 A1 | 12/2021 | |
| EP | 3952892 A1 | 2/2022 | |
| EP | 4003305 A1 | 6/2022 | |
| EP | 4069826 A1 | 10/2022 | |
| EP | 4132546 A2 | 2/2023 | |
| EP | 4181935 A1 | 5/2023 | |
| JP | 2008-544957 A | 12/2008 | |
| JP | 2011513217 A | 4/2011 | |
| JP | 2014500249 A | 1/2014 | |
| JP | 2017180553 A | 10/2017 | |
| JP | 2018538132 A | 12/2018 | |
| JP | WO2019235362 A1 | 7/2021 | |
| JP | 2022516607 A | 3/2022 | |
| KR | 20180023865 A | 3/2018 | |
| KR | 20180127280 A | 11/2018 | |
| WO | WO-03051331 A1 | 6/2003 | |
| WO | WO-2006036213 A2 | 4/2006 | |
| WO | WO-2006071011 A1 | 7/2006 | |
| WO | WO-2009105044 A1 | 8/2009 | |
| WO | WO-2009150199 A1 | 12/2009 | |
| WO | WO-2011160055 A2 | 12/2011 | |
| WO | WO-2012061537 A2 | 5/2012 | |
| WO | WO-2012125471 A1 | 9/2012 | |
| WO | 2012/142569 A2 | 10/2012 | |
| WO | WO-2012174282 A2 | 12/2012 | |
| WO | WO-2013006327 A1 | 1/2013 | |
| WO | WO-2013090523 A2 | 6/2013 | |
| WO | WO-2013150303 A1 | 10/2013 | |
| WO | WO-2013159091 A2 | 10/2013 | |
| WO | WO-2014005183 A1 | 1/2014 | |
| WO | 2015/031110 A2 | 3/2015 | |
| WO | WO-2015048842 A1 | 4/2015 | |
| WO | 2016/082882 | 6/2016 | |
| WO | WO-2016149358 A1 | 9/2016 | |
| WO | WO-2016156865 A1 | 10/2016 | |
| WO | WO-2017001649 A1 | 1/2017 | |
| WO | WO-2017023689 A1 | 2/2017 | |
| WO | WO-2017076924 A1 | 5/2017 | |
| WO | 2017117585 A1 | 7/2017 | |
| WO | WO-2017122095 A1 | 7/2017 | |
| WO | WO-2017123022 A1 | 7/2017 | |
| WO | WO-2017139795 A1 * | 8/2017 | ........... A01N 1/0221 |
| WO | WO-2017196798 A1 | 11/2017 | |
| WO | WO-2017218846 A1 | 12/2017 | |
| WO | 2018/038575 A1 | 3/2018 | |
| WO | WO-2018078524 A1 | 5/2018 | |
| WO | WO-2018083700 A1 * | 5/2018 | ............. A61K 35/28 |
| WO | WO-2018102696 A1 | 6/2018 | |
| WO | WO-2018130554 A1 | 7/2018 | |
| WO | WO-2018131003 A1 | 7/2018 | |
| WO | WO-2018131900 A2 | 7/2018 | |
| WO | WO-2018144637 A1 | 8/2018 | |
| WO | WO-2018150440 A1 | 8/2018 | |
| WO | WO-2018162696 A1 | 9/2018 | |
| WO | WO-2018204889 A1 | 11/2018 | |
| WO | WO-2018208670 A1 | 11/2018 | |
| WO | WO-2018211510 A1 | 11/2018 | |
| WO | WO-2018226758 A2 | 12/2018 | |
| WO | WO-2019035880 A1 | 2/2019 | |
| WO | WO-2019040896 A1 | 2/2019 | |
| WO | WO-2019099955 A1 | 5/2019 | |
| WO | WO-2019118817 A1 | 6/2019 | |
| WO | WO-2019143847 A1 | 7/2019 | |
| WO | WO-2019152522 A1 | 8/2019 | |
| WO | WO-2019161590 A1 | 8/2019 | |
| WO | WO-2019217091 A1 | 11/2019 | |
| WO | WO-2019222170 A1 | 11/2019 | |

(56) References Cited

FOREIGN PATENT DOCUMENTS

| | | |
|---|---|---|
| WO | WO-2019231562 A1 | 12/2019 |
| WO | WO-2019235362 A1 | 12/2019 |
| WO | WO-2020021312 A1 | 1/2020 |
| WO | WO-2020061408 A1 | 3/2020 |
| WO | WO-2020081859 A1 | 4/2020 |
| WO | WO-2020139975 A1 | 7/2020 |
| WO | WO-2020142769 A1 | 7/2020 |
| WO | WO-2020160342 A1 | 8/2020 |
| WO | WO-2020163705 A1 | 8/2020 |
| WO | WO-2020163803 A1 | 8/2020 |
| WO | WO-2020172270 A1 | 8/2020 |
| WO | WO-2020182938 A1 | 9/2020 |
| WO | WO-2020210248 A1 | 10/2020 |
| WO | WO-2020223349 A1 | 11/2020 |
| WO | WO-2020230954 A1 | 11/2020 |
| WO | WO-2020251181 A1 | 12/2020 |
| WO | WO-2020257720 A1 | 12/2020 |
| WO | WO-2021009660 A1 | 1/2021 |
| WO | WO-2021011935 A1 | 1/2021 |
| WO | WO-2021016368 A1 | 1/2021 |
| WO | WO-2021016727 A1 | 2/2021 |
| WO | WO-2021113299 A1 | 6/2021 |
| WO | WO-2021113761 A1 | 6/2021 |
| WO | WO-2021147923 A1 | 7/2021 |
| WO | WO-2021177473 A1 | 9/2021 |
| WO | WO-2021181399 A1 | 9/2021 |
| WO | WO-2021195154 A1 | 9/2021 |
| WO | WO-2021207282 A2 | 10/2021 |
| WO | WO-2021216903 A1 | 10/2021 |
| WO | WO-2021221471 A1 | 11/2021 |
| WO | WO-2021226108 A1 | 11/2021 |
| WO | WO-2021262879 A1 | 12/2021 |
| WO | WO-2022008654 A1 | 1/2022 |
| WO | WO-2022008657 A1 | 1/2022 |
| WO | WO-2022018729 A1 | 1/2022 |
| WO | WO-2022050373 A1 | 3/2022 |
| WO | WO-2022076419 A1 | 4/2022 |
| WO | WO-2022096708 A1 | 5/2022 |
| WO | WO-2022150696 A1 | 7/2022 |
| WO | WO-2022174079 A1 | 8/2022 |
| WO | WO-2022190091 A1 | 9/2022 |
| WO | WO-2022251167 A2 | 12/2022 |
| WO | WO-2022261636 A1 | 12/2022 |
| WO | WO-2022265864 A2 | 12/2022 |
| WO | WO-2022266399 A1 | 12/2022 |
| WO | WO-2023004087 A2 | 1/2023 |
| WO | WO-2023275164 A1 | 1/2023 |
| WO | WO-2023278883 A1 | 1/2023 |
| WO | WO-2023281524 A1 | 1/2023 |
| WO | WO-2023282424 A1 | 1/2023 |
| WO | WO-2023021525 A1 | 2/2023 |
| WO | WO-2023024637 A1 | 3/2023 |
| WO | WO-2023033500 A1 | 3/2023 |
| WO | WO-2023064555 A1 | 4/2023 |
| WO | WO-2023075557 A1 | 5/2023 |
| WO | WO-2023082012 A1 | 5/2023 |
| WO | WO-2023091904 A1 | 5/2023 |
| WO | WO-2023123216 A1 | 7/2023 |
| WO | WO-2023127645 A1 | 7/2023 |
| WO | WO-2023192916 A2 | 10/2023 |
| WO | WO-2024192119 A1 | 9/2024 |
| WO | WO-2024254459 A2 | 12/2024 |
| WO | WO-2024254540 A2 | 12/2024 |

OTHER PUBLICATIONS

Romanov, Y. A., et al., "Comparative Analysis of Secretome of Human Umbilical Cord- and Bone Marrow-Derived Multipotent Mesenchymal Stromal Cells," Bull Exp Biol Med 166(4): 535-540. doi: 10.1007/s10517-019-04388-1. Epub Feb. 22, 2019. (Year: 2019).*

Enes, S. R., et al., "Quantitative proteomic characterization of lung-MSC and bone marrow-MSC using DIA-mass spectrometry," Sci Rep 7(1): 9316. doi: 10.1038/s41598-017-09127-y (Year: 2017).*

Dong, L., et al., "Treatment of MSCs with Wnt1a-conditioned medium activates DP cells and promotes hair follicle regrowth," Sci Rep 4: 543. 2doi: 10.1038/srep05432. (Year: 2014).*

Chen, L., et al., "Paracrine factors of mesenchymal stem cells recruit macrophages and endothelial lineage cells and enhance wound healing," PLoS One 3(4):e1886. doi: 10.1371/journal.pone. 0001 (Year: 2008).*

Polacek, M., et al., "The secretory profiles of cultured human articular chondrocytes and mesenchymal stem cells: implications for autologous cell transplantation strategies," Cell Transplant. 2011;20(9):1381-1393. doi: 10.3727/096368910X550215. (Year: 2011).*

Zimmerlin, L., et al., "Mesenchymal stem cell secretome and regenerative therapy after cancer," Biochimie 95: 2235-2245. doi: 10.1016/j.biochi.2013.05.010. (Year: 2013).*

Chen, L., et al., "Paracrine factors of mesenchymal stem cells recruit macrophages and endothelial lineage cells and enhance wound healing," PLoS One 3(4):e1886. doi: 10.1371/journal.pone. 0001886. (Year: 2008).*

Office Action received in corresponding Japanese Application No. JP2021-517548 mailed Apr. 4, 2023.

Search Report issued in EP 19812212.9, dated Mar. 16, 2022, 14 pages.

Kia et al. "Secretome from hypoxia-conditioned adiposederived mesenchymal stem cells promotes the healing of gastric mucosal injury in a rodent model", Biochimica Et Biophysica Acta. Molecular Basis of Disease, vol. 1864, No. 1, pp. 178-188, XP085287628, ISSN: 0925-4439, DOI: 10.1016/J.BBADIS.2017.10.009.

Santos et al. "Three-dimensional spheroid cell culture of umbilical cord tissue-derived mesenchymal stromal cells eads to enhanced paracrine induction of wound healing", Stem Cell Research & Therapy, Biomed Central Ltd, London, UK, vol. 6, No. 1,May 9, 2015 (May 9, 2015), p. 90, XP021223497, ISSN: 1757-6512, DOI: 10.1186/S13287-015-0082-5.

Cunningham et al. "The therapeutic potential of the mesenchymal stem cell secretome in ischaemic stroke", Journal of Cerebral Blood Flow & Metabolism, vol. 38, No. 8, May 17, 2018 (May 17, 2018), pp. 1276-1292, XP055897226, US ISSN: 0271-678X, DOI: 10.1177/ 0271678X18776802 Retrieved from the Internet: URL:http://journals. sagepub.com/doi/full-xml/10.1177/0271678X18776802.

Julianto et al. "Topical Delivery of Mesenchymal Stem Cells "Secretomes" in Wound Repair", Acta Medica Indonesiana, vol. 48, No. 3, Jul. 1, 2016 (Jul. 1, 2016), pp. 217-220, XP055898006, in ISSN: 0125-9326.

International Search Report and Written Opinion issued in PCT/ US2019/026595, dated Jul. 2, 2019, 13 pages.

Qi et al. "Exosomes Secreted by Human-Induced Pluripotent Stem Cell-Derived Mesenchymal Stem Cells Repair Critical-Sized Bone Defects through Enhanced Angiogenesis and Osteogenesis in Osteoporotic Rats," International Journal of Biological Sciences, May 25, 2016 (May 25, 2016), vol. 12, No. 7, pp. 836-849.

Gennaro, A.R.: Remington: The science and practice of pharmacy. 19th edition. 1995. 12 Pages.

PCT/US2019/026595 International Preliminary Report on Patentability dated Dec. 1, 2020.

PCT/US2019/026595 International Search Report and Written Opinion dated Jul. 2, 2019.

Qi et al.: Exosomes Secreted by Human-Induced Pluripotent Stem Cell-Derived Mesenchymal Stem Cells Repair Critical-Sized Bone Defects through Enhanced Angiogenesis and Osteogenesis in Osteoporotic Rats. International Journal of Biological Sciences 12(7):836-849 (2016).

Aatonen, Maria et al. Isolation and Characterization of Platelet-derived Extracellular Vesicles. Journal of Extracellular Vesicles 3:1-15 (2014).

Alam et al., An osteopontin-derived peptide inhibits human hair growth at least in part by decreasing fibroblast growth factor-7 production in outer root sheath keratinocytes. Br J Dermatol 182(6):1404-1414 (2020).

AU2019416339 Examination Report dated Sep. 16, 2024.

Aversa et al., Platelet-derived growth factor (PDGF) and PDGF receptors in rat corpus cavernosum: changes in expression after transient in vivo hypoxia. J Endocrinol. 170(2):395-402 (2001).

(56) References Cited

OTHER PUBLICATIONS

Backlund, Lena et al. Cognitive manic symptoms associated with the P2RX7 gene in bipolar disorder. Bipolar disorders 13(5-6):500-508 (2011).
Bagshawe, K. D., et al. A cytotoxic agent can be generated selectively at cancer sites. British Journal of Cancer 58(6):700-703 (1988).
Bagshawe, K. D. Towards generating cytotoxic agents at cancer sites. The First Bagshawe Lecture. Br. J. Cancer 60:275-281 (1989).
Ball et al., Arthroscopic treatment of post-traumatic elbow contracture. Journal of Shoulder and Elbow Surgery 11(6):624-629 (2002).
Barnett, J H, and J W Smoller. The genetics of bipolar disorder. Neuroscience 164(1):331-343 (2009).
Bassir, Seyed Hossein et al. Potential for Stem Cell-based Periodontal Therapy. Journal of Cellular Physiology 231(1):50-61 (2016).
Batch et al., Identification and localization of insulin-like growth factor-binding protein (IGFBP) messenger RNAs in human hair follicle dermal papilla. J Invest Dermatol. 106(3):471-475 (1996).
Battelli et al., T lymphocyte killing by a xanthine-oxidase-containing immunotoxin. Cancer Immunology, Immunotherapy 35(6):421-425 (1992).
Beitzel et al., The future role of mesenchymal stem cells in the management of shoulder disorders. Arthroscopy 29(10):1702-1711 (2013).
Bender et al.: Intra-Articular Injection of an Extracellular Vesicle Isolate to Treat Shoulder Osteoarthritis in an Athlete. J Regen Biol Med. 2(1):1-6 (2020).
Bender et al.: Treatment of Elbow Arthritis with a Bone Marrow derived Mesenchymal Stem Cell Extracellular Vesicle Isolate Product. J Orthop Study Sports Med. 1(1):1-6 (2021).
Bertolini et al., Abnormal interactions between perifollicular mast cells and CD8+ T-cells may contribute to the pathogenesis of alopecia areata. PLoS ONE. 9:e94260 (2014).
Bisaga et al., The use of mesenchymal stem cells in optic nerve atrophy in patients with multiple sclerosis: a pilot study. Annals of Clinical and Experimental Neurology 11(2):201 [2201] (2017).
Biswas et al., Primary and secondary arthritis of the elbow. Arthritis. 2013, May 27 (2013).
Black et al., Effect of adipose-derived mesenchymal stem and regenerative cells on lameness in dogs with chronic osteoarthritis of the coxofemoral joints: a randomized, double-blinded, multicenter, controlled trial. Vet Ther 8:272-284 (2007).
Black et al., Effect of intraarticular injection of autologous adipose-derived mesenchymal stem and regenerative cells on clinical signs of chronic osteoarthritis of the elbow joint in dogs. Vet Ther. 9:192-200 (2008).
Bligh, Richard, and Robert Besancenez. Safety and Efficacy of Bone Marrow Mesenchymal Stem Cell Extracellular Vesicles in Long COVID Patients: A Case Series. Journal of Stem Cells Research Development & Therapy 10(1):1000112, 1-8 (2024).
Bligh: Treatment of Idiopathic Pulmonary Fibrosis With an Extracellular Vesicle Isolate Product. International Journal of Science and Research Archive. 02(02):231-236 (2021).
Blood And Marrow Stem Cell Transplantation. Leukemia & Lymphoma Society Retrieved from Internet URL: http://www.lls.org/resource-center/download-or-order-free-publications. Accessed on Jul. 8, 2016.
Boraschi CA, IL-18 in autoimmunity: review. Eur Cytokine Netw. 17:224-252 (2006).
Botchkarev et al., Edar signaling in the control of hair follicle development. J Investig Dermatol Symp Proc. 10(3):247-251 (2005).
BR2021012661 Office Action dated Sep. 3, 2024, and a partial English translation.
Brigham et al. Expression of a prokaryotic gene in cultured lung endothelial cells after lipofection with a plasmid vector. Am. J. Resp. Cell. Mol. Biol. 1:95-100 (1989).
Brown et al., Molecular and cellular mechanisms of receptor-mediated endocytosis. DNA and Cell Biology 10(6):399-409 (1991).
Burnett et al., GGF2 is neuroprotective in a rat model of cavernous nerve injury-induced erectile dysfunction. J Sex Med. 12(4):897-905 (2015).
Cabana: An Update on Exosomes. Aesthetic Authority. Technology Pipeline: Aestic Authority 2(1):22 (2020) https://www.dermatologytimes.com/view/an-update-on-exosomes.
Cai et al., Suppression of hepatocyte growth factor production impairs the ability of adipose-derived stem cells to promote ischemic tissue revascularization. Stem Cells 25(12):3234-3243 (2007).
Caplan et al., Mesenchymal stem cells as trophic mediators. J Cell Biochem 98:1076-1084 (2006).
Caplan et al., The MSC: an injury drugstore. Cell Stem Cell 9(1):11-5 (2011).
Carneiro et al., Emerging role for TNF-a in erectile dysfunction. J Sex Med. 7(12):3823-3834 (2010).
Celik et al., Genetic analysis of interleukin 18 gene polymorphisms in alopecia areata. J Clin Lab Anal. 32(5):e22386 (2018).
Centeno: Exosomes, Mary Kaye, and Pink Caddys (2019) https://regenexx.com/blog/direct-biologics-exosomes/.
Centers for Disease Control and Prevention (CDC) Prevalence and most common causes of disability among adults—United States, 2005. Morbidity and Mortality Weekly Report 58(16):421-426 (2009).
Chang et al., Exosomes and stem cells in degenerative disease diagnosis and therapy. Cell Transplantation 27(3):349-363 (2018).
Chang et al., Tissue engineering based cartilage repair with mesenchymal stem cells in a porcine model. J Orthop Res 29:1874-1880 (2011).
Chen et al., Regenerative hair waves in aging mice and extrafollicular modulators follistatin, dkkl, and sfrp4. J Invest Dermatol. 134(8):2086-2096 (2014).
Chen, Lei et al. Pre-vascularization Enhances Therapeutic Effects of Human Mesenchymal Stem Cell Sheets in Full Thickness Skin Wound Repair. Theranostics 7(1):117-131 (2017).
Cheng, Daye et al. The relationship between interleukin-18 polymorphisms and allergic disease: a meta-analysis. BioMed Research International 2014(1):290687, 1-11 (2014).
Cheng et al., Focus on mesenchymal stem cell-derived exosomes: opportunities and challenges in cell-free therapy. Stem Cells Int. 2017:6305295 (2017).
Chew et al., Mesenchymal stem cell exosomes enhance periodontal ligament cell functions and promote periodontal regeneration. Acta Biomater 15:89:252-264 (2019).
Chew et al., Mesenchymal stem cells in human meniscal regeneration: a systemic review. Ann Med Surg. 24:3-7 (2017).
Choi et al., Exosomes secreted by human adipose-derived stem cells regulate the expression of collagen synthesis -related genes in human dermal fibroblasts. Abstract Book: ISEV2017, Journal of Extracellular Vesicles 6:supl:1310414; PF11.07; 141-141 (2017).
Clinical Trial No. NCT04493242. Extracellular Vesicle Infusion Treatment for COVID-19 Associated ARDS. https://clinicaltrials.gov/study/NCT04493242 (Jul. 29, 2020).
Clinical Trial No. NCT04657458. Expanded Access for Use of bmMSC-Derived Extracellular Vesicles in Patients With COVID-19 Associated ARDS. https://clinicaltrials.gov/study/NCT04657458 (Dec. 7, 2020).
Clinical Trial No. NCT05116761. ExoFlo™ Infusion for Post-Acute COVID-19 and Chronic Post-COVID-19 Syndrome. https://clinicaltrials.gov/study/NCT05116761 (Nov. 9, 2021).
Clinical Trial No. NCT05125562. Extracellular Vesicles Infusion Treatment for Mild-to-Moderate COVID-19. https://clinicaltrials.gov/study/NCT05125562 (Nov. 16, 2021).
Clinical Trial No. NCT05127122. Bone Marrow Mesenchymal Stem Cell Derived Extracellular Vesicles Infusion Treatment for ARDS. https://clinicaltrials.gov/study/NCT05127122 (Nov. 9, 2021).
Clinical Trial No. NCT05130983. Study of ExoFlo for the Treatment of Medically Refractory Crohn's Disease. https://clinicaltrials.gov/study/NCT05130983 (Nov. 16, 2021).
Clinical Trial No. NCT05176366. Study of ExoFlo for the Treatment of Medically Refractory Ulcerative Colitis. https://clinicaltrials.gov/study/NCT05176366 (Dec. 14, 2021).

(56) References Cited

OTHER PUBLICATIONS

Clinical Trial No. NCT05215288. Expanded Access for Use of ExoFlo in Abdominal Solid Organ Transplant Patients https://clinicaltrials.gov/study/NCT05215288 (Jan. 18, 2022).
Clinical Trial No. NCT05354141. Extracellular Vesicle Treatment for Acute Respiratory Distress Syndrome (ARDS) (EXTINGUISH ARDS). https://clinicaltrials.gov/study/NCT05354141 (Apr. 22, 2022).
Clinical Trial No. NCT05836883. Study of ExoFlo for the Treatment of Perianal Fistulas. https://clinicaltrials.gov/study/NCT05836883 (Apr. 19, 2023).
Conese et al.: Paracrine Effects and Heterogeneity of Marrow-Derived Stem/Progenitor Cells: Relevance for the Treatment of Respiratory Diseases. Cells Tissues Organs. 197:445-473 (2013).
Co-pending Appl. Serial No. PCT/US2019/026595 Application as Filed Apr. 9, 2019.
Co-pending Appl. Serial No. PCT/US2019/068615 Application as Filed Dec. 26, 2019.
Co-pending Appl. Serial No. PCT/US2020/012359 Application as Filed Jan. 6, 2020.
Co-pending Appl. Serial No. PCT/US2020/015982 Application as Filed Jan. 30, 2020.
Co-pending Appl. Serial No. PCT/US2020/017341 Application as Filed Feb. 7, 2020.
Co-pending Appl. Serial No. PCT/US2020/018821 Application as Filed Feb. 19, 2020.
Co-pending Appl. Serial No. PCT/US2020/030476 Application as Filed Apr. 29, 2020.
Co-pending Appl. Serial No. PCT/US2020/042762 Application as Filed Jul. 20, 2020.
Co-pending Appl. Serial No. PCT/US2021/028686 Application as Filed Apr. 22, 2021.
Co-pending Appl. Serial No. PCT/US2023/065115 Application as Filed Mar. 29, 2023.
Co-pending Appl. Serial No. PCT/US2024/019725 Application as Filed Mar. 13, 2024.
Co-pending Appl. Serial No. PCT/US2024/026444 Application as Filed Apr. 26, 2024.
Co-pending Appl. Serial No. PCT/US2024/033022 Application as Filed Jun. 7, 2024.
Co-pending Appl. Serial No. PCT/US2024/033123 Application as Filed Jun. 7, 2024.
Co-pending U.S. Appl. No. 17/418,342 Claims as of May 21, 2024.
Co-pending U.S. Appl. No. 17/420,500 Claims as of Jun. 13, 2024.
Co-pending U.S. Appl. No. 17/427,192 Claims as of Jun. 13, 2024.
Co-pending U.S. Appl. No. 17/429,553 Claims as of Aug. 9, 2021.
Co-pending U.S. Appl. No. 17/432,138 Claims as of Aug. 19, 2021.
Co-pending U.S. Appl. No. 17/606,514 Claims as of Oct. 26, 2021.
Co-pending U.S. Appl. No. 17/628,011 Claims as of Jan. 18, 2022.
Co-pending U.S. Appl. No. 17/920,997 Claims as of Oct. 24, 2022.
Co-pending U.S. Appl. No. 18/192,593 Claims as of Jun. 7, 2023.
Cosenza, et al. Mesenchymal stem cells derived exosomes and microparticles protect cartilage and bone from degradation in osteoarthritis. Sci Rep 7(1):16214, 1-12 (2017).
Crose et al.: Bone marrow mesenchymal stem cell-derived extracellular vesicle infusion for amyotrophic lateral sclerosis. Neurodegenerative Disease Management, 1-7 (2024).
Crose, Joshua J: Treating amyotrophic lateral sclerosis with a bone marrow derived mesenchymal stem cell extracellular vesicles. A case report. International Journal of Science and Research Archive. 02(02):167-171 (2021).
Database WPI Week 201851 Thomson Scientific, London, GB; AN 2018-41069T XP002807292, & CN 108 042 572 A (Beijing Doing Time Translational Medicin) May 18, 2018.
Database WPI Week 201877 Thomson Scientific, London, GB; AN 2018-724966 XP002807291, & CN 108 498 452 A (Univ Shanghai Second Med Renji Hospital) Sep. 7, 2018.
De Boeck, Astrid et al. Bone marrow-derived mesenchymal stem cells promote colorectal cancer progression through paracrine neuregulin 1/HER3 signalling. Gut 62(4):550-560 (2013). Online Published Apr. 25, 2012.
DeJong et al.: Extracellular vesicles: potential roles in regenerative medicine. Frontiers in Immunology. 5:608 (2014).
Direct Biologics, LLC Announces the Launch of ExoFlo Exosomes. Press Release (2019).
Direct Biologics Received FDA Approval to Initiate 'EXIT-COVID-19,' a Phase II Investigational New Drug Trial. (2020).
Dordevic et al., Intra-articular injection of an extracellular vesicle isolate product to treat hip labral tears. Journal of Regenerative Biology and Medicine 11:1-6 (2019).
Dreschnack, Paul A, and Ina Belshaku. Treatment of Idiopathic Facial Paralysis (Bell's Palsy) and Secondary Facial Paralysis With Extracellular Vesicles: a Pilot Safety Study. BMC Neurology 23(1):342, 1-9 (2023).
Dwyer et al., The acetabular labrum regulates fluid circulation of the hip joint during functional activities. Am J Sports Med. 42(4):812-819 (2014).
East et al.: Can IV Infusions of Bone Marrow Derived Mesenchymal Stem Cell Extracellular Vesicles Be the Fountain of Youth? Journal of Regenerative Biology and Medicine. 1(2):1-10 (2019).
East et al.: Intra-Articular Injection of an Extracellular Vesicle Isolate Product to Treat Hip Labral Tears. Journal of Regenerative Biology and Medicine. J Regen Biol Med. 2019;1(1):1-6 (2019).
East et al.: Intra-Articular Injection of an Extracellular Vesicle Isolate Product to Treat Knee Osteoarthritis in an Athlete. Journal of Biomedical Research and Clinical Investigation. 1(1):1005 (2020).
East et al.: IRB Approved Pilot Safety Study of an Extracellular Vesicle Isolate Product Evaluating the Treatment of Osteoarthritis in Combat-Related Injuries. Stem Cell Res. 1(2)-11 (2020).
East et al.: Pilot Safety Study of an Extracellular Vesicle Isolate Product for Treatment of Osteoarthritis in Combat-Related Injuries: One Year Follow Up. Genesis-JSCR-2(2)-21:1-10 (2021).
East et al.: The Safety Profile of a Bone Marrow-Derived Mesenchymal Stem Cell Extracellular Vesicle Isolate Product. J of Stem Cell Research. 6:026 (2020).
EP19906384.3 Extended European Search Report dated Aug. 29, 2022.
Epifanova et al., [Investigation of mechanisms of action of growth factors of autologous platelet-rich plasma used to treat erectile dysfunction]. Urologiia. Sep. 2017;(4):46-48 (2017) Russian. English Abstract Provided.
Erhardt et al., Association of polymorphisms in P2RX7 and CaMKKb with anxiety disorders. Journal of Affective Disorders 101(1-3):159-168 (2007).
Fan et al., Synovium-derived mesenchymal stem cells: a new source for musculoskeletal regeneration. Tissue Engineering Part B Review 15(1):75-86 (2009).
Felgner, Philip L, et al., Lipofection: A Highly Efficient, Lipid-Mediated DNA-Transfection Procedure. Proceedings of the National Academy of Sciences of the United States of America 84(21):7413-7417 (1987).
Feng et al. Transplantation of mesenchymal stem cells and nucleus pulposus cells in a degenerative disc model in rabbits: a comparison of 2 cell types as potential candidates for disc regeneration. J Neurosurgery Spine 14:322-329 (2011).
Fouad et al., Interleukin-18 gene polymorphisms in systemic lupus erythematosus: relation to disease status. Egypt J Immunol. 21:1-12 (2014).
Freitag et al., Mesenchymal stem cell therapy in the treatment of Osteoarthritis: reparative pathways,safety, and efficacy: a review. BMC Musculoskeletal Disorders 17:230 (2016).
Frisbie et al., Clinical update on the use of mesenchymal stem cells in equine orthopaedics. Equine Veterinary Journal, 42:86-89 (2010).
Fu, H et al., Identification of human fetal liver miRNAs by a novel method. FEBS letters 579(17):3849-3854 (2005).
Gao, Lei. et al. Association of endothelial nitric oxide synthase polymorphisms with an increased risk of erectile dysfunction. Asian journal of andrology 19(3):330-337 (2017).
Gilhar A. Collapse of immune privilege in alopecia areata: coincidental or substantial? J Invest Dermatol. 130(11):2535-2537 (2010).
Giugliano et al., Erectile dysfunction associates with endothelial dysfunction and raised proinflammatory cytokine levels in obese men. J Endocrinol Invest. 27(7):665-669 (2004).

(56) References Cited

OTHER PUBLICATIONS

Guerico et al., Production of canine mesenchymal stem cells from adipose tissue and their application in dogs with chronic osteoarthritis of the humeroradial joints. Cell Biol Int 36:189-194 (2012).
Guo et al., Exosomes derived from platelet-rich plasma promote the re-epithelization of chronic cutaneous wounds via activation of YAP in a diabetic rat model. Theranostics 7(1):81-96 (2017).
Hara, Tomonori et al. Genetics of bipolar disorder: insights into its complex architecture and biology from common and rare variants. Journal of human genetics 68(3):183-191 (2023). Published online May 26, 2022.
Harris JD. Hip labral repair: options and outcomes. Curr Rev Musculoskelet Med. 9(4):361-367 (2016).
Heijnen, Harry F. et al. Activated Platelets Release Two Types of Membrane Vesicles Microvesicles by Surface Shedding and Exosomes Derived From Exocytosis of Multivesicular Bodies and Alpha-granules. Blood 94(11)3791-3799 (1999).
Hessvik et al.: Current knowledge on exosome biogenesis and release description. Cell. Mol. Life Sci. 75:193-208 (2018).
Hicok et al.: Exosome Origins: Why the Cell Source Matters. Stem Cells Regen Med. 4(1):1-4 (2020).
Hiyama et al., Transplantation of mesenchymal stem cells in a canine disc degeneration model. J Orthop Res 26:589-600 (2008).
Ho, Chih-Yi. et al. Clinical and genetic aspects of alopecia areata: a cutting edge review. Genes 14(7):1362, 1-20 (2023).
Hotaling et al., DCCT/EDIC Research Group. Pilot genome-wide association search identifies potential loci for risk of erectile dysfunction in type 1 diabetes using the DCCT/EDIC study cohort. J Urol. 188(2):514-520 (2012).
Hou, Chun et al., Expression of matrix metalloproteinases and tissue inhibitor of matrix metalloproteinases in the hair cycle. Exp Ther Med. 12(1):231-237 (2016).
Howe et al.: The miracle of stem cells. Stemedica Cell Technologies, Inc. 202-210 (2011).
Howe et al., The miracle of stem cells. Stemedica Cell Technologies pp. 202-210 (2011).
Hughes et al., Monoclonal antibody targeting of liposomes to mouse lung in vivo. Cancer Research 49(22):6214-6220 (1989).
Jacob et al., Association of the oxytocin receptor gene (OXTR) in caucasian children and adolescents with autism. Neuroscience Letters 417(1):6-9 (2007).
Jaeger et al., "Improved predictions of secondary structures for RNA", Proceedings of the National Academy of Sciences, vol. 86, No. 20, Oct. 1, 1989, pp. 7706-7710.
Jaeger, John A, et al., [17] Predicting optimal and suboptimal secondary structure for RNA. Methods in Enzymology 183:281-306 (1989).
Japanese Application No. 2021-537063 Office Action dated Dec. 15, 2023.
Japanese Application No. 2021-564403 Office Action dated May 30, 2024.
Johnston et al., A point mutation in PDGFRB causes autosomal-dominant Penttinen syndrome. Am J Hum Genet. 97(3):465-474 (2015).
Jorgenson, Eric et al. Genetic variation in the SIM1 locus is associated with erectile dysfunction. Proceedings of the National Academy of Sciences 115(43):11018-11023 (2018).
JP2021544344 Office Action dated Dec. 12, 2023, and an English translation.
JP2021546214 Office Action dated Dec. 19, 2023, and a partial English translation.
Kambur et al., Genetic variation in P2RX7 and pain tolerance. Pain 159(6):1064-1073 (2018).
Kandola et al., How does rheumatoid arthritis affect the wrists? Medical News Today https://www.medicalnewstoday.com/articles/323056 (2018).
Kavoussi et al., Recombinant PAI-1 therapy restores myoendothelial junctions and erectile function in PAI-1-deficient mice. Andrologia 47(10):1147-1152 (2015).
Kawabe et al., Localization of TIMP in cycling mouse hair. Development 111(4):877-879 (1991).
Kellgren et al., Radiological assessment of osteo-arthrosis. Ann Rheum Dis Dec. 16(4):494-502 (1957).
Kelly et al., Arthroscopic debridement without radial head excision of the osteoarthritic elbow. Arthroscopy 23(2):151-156 (2007).
Kim et al., Association between interleukin 18 polymorphisms and alopecia areata in Koreans. J Interferon Cytokine Res. 34:349-353 (2014).
Kim et al., Mesenchymal stem cells vs. mesenchymal stem cell secretome for rheumatoid arthritis treatment. JSM Arthritis, vol. 1(1):1001 (2016).
Kim et al.: Wound healing effect of adipose-derived stem cells: A critical role of secretory factors on human dermal fibroblasts. Journal of Dermatological Science. 48:15-24 (2007).
Kinane, Denis F. et al. Periodontal diseases. Nature reviews Disease primers 3:17038, 1-14 (2017).
Koga et al., Synovial stem cells are regionally specified according to local microenvironments after implantation for cartilage regeneration. Stem Cells 25:689-696 (2007).
Koizumi et al., Distribution of IL-18 and IL-18 receptor in human skin: various forms of IL-18 are produced in keratinocytes. Arch Dermatol Res. 293(7):325-333 (2001).
Krych et al., Modest mid-term outcomes after isolated arthroscopic debridement of acetabular tears. Knee Surg Sports Traumatol Arthrosc. 22(4):763-767 (2014).
Lai et al., Androgenic alopecia is associated with less dietary soy, higher blood vanadium and rs1160312 1 polymorphism in Taiwanese communities. PLos One 8(12):e79789, 1-11 (2013).
Lankford, Karen L, et al., Intravenously Delivered Mesenchymal Stem Cell-derived Exosomes Target M2-type Macrophages In The Injured Spinal Cord. PLoS One 13(1):e0190358, 20 Pages (2018).
Lecuyer et al., Dual role of ALCAM in neuroinflammation and blood-brain barrier homeostasis. Proc Natl Acad Sci U S A. 114(4):E524-E533 (2017).
Lee et al., Injectable mesenchymal stem cell therapy for large cartilage defects—a porcine model. Stem Cells 25:2964-2971 (2007).
Letsinger, Robert. L. et al. Cholesteryl-conjugated oligonucleotides: Synthesis, properties, and activity as inhibitors of replication of human immunodeficiency virus in cell culture. Proceedings of the National Academy of Sciences of the United States of America 86(17):6553-6556 (1989).
Levitte et al.: Mesenchymal stem cell-derived extracellular vesicles for the treatment of acute rejection in pediatric and adult bowl transplant. American Journal of Transplantation. 1-4 (2023).
Li, et al. Emerging Role of Exosomes in the Joint Diseases. Cell Physiol Biochem 47(5):2008-2017 (2018).
Li et al.: Mesenchymal stem cells and acellular products attenuate murine induced colitis. Stem Cell Research & Therapy. 11:515 (2020).
Li et al., Six novel susceptibility loci for early-onset androgenetic alopecia and their unexpected association with common diseases. PLoS Genetics 8(5):e1002746, 1-9 (2012).
Libro et al., Cannabidiol modulates the immunophenotype and inhibits the activation of the inflammasome in human gingival mesenchymal stem cells. Frontiers in Physiology 7:559 (2016).
Lichtenstein, A et al., Liposome-encapsulated silver sulfadiazine (SSD) for the topical treatment of infected burns: thermodynamics of drug encapsulation and kinetics of drug release. Journal of inorganic biochemistry 60(3):187-198 (1995).
Lightner, Amy L. et al. Bone Marrow Mesenchymal Stem Cell-Derived Extracellular Vesicle Infusion for the Treatment of Respiratory Failure From COVID-19: A Randomized, Placebo-Controlled Dosing Clinical Trial. Chest 164(6):1444-1453 (2023).
Lim et al.: Letter to the Editor re: "Exosomes Derived from Bone Marrow Mesenchymal Stem Cells as Treatment for Severe COVID-19" by Sengupta et al. Stem Cells and Development. 00(00) (2020).
Little et al., Total elbow arthroplasty: a systematic review of the literature in the English language until the end of 2003. Journal of Bone and Joint Surgery 87(4):437-444 (2005).
Litzinger et al., Biodistribution and immunotargetability of ganglioside-stabilized dioleoylphosphatidylethanolamine liposomes. Biochimica et Biophysica Acta (BBA)—Biomembranes 1104(1):179-187 (1992).

(56) References Cited

OTHER PUBLICATIONS

Liu et al., Prediction of male-pattern baldness from genotypes. European Journal of Human Genetics 24:895-902 (2015).
Lou, Danning et al. Single nucleotide polymorphisms in the non-coding region of STIM1 gene are associated with Parkinson disease risk in Chinese Han population. Medicine 99(9):e19234, 1-10 (2020).
Mancuso et al., Mesenchymal stem cell therapy for osteoarthritis: the critical role of the cell secretome. Front Bioeng Biotechnol 7:9 [1-9] (2019).
Marcinska et al., Evaluation of DNA variants associated with androgenetic alopecia and their potential to predict male pattern baldness. PLoS One 10(5):1-18, e0127852 (2015).
Massa et al.: Clinical Applications of Mesenchymal Stem/Stromal Cell Derived Extracellular Vesicles: Therapeutic Potential of an Accellular Product. Diagnostics. 10:999 (2020).
Mathieu et al.: Specificities of exosome versus small ectosome secretion revealed by live intracellular tracking of CD63 and CD9. Nat Commun. 12(4389):1-18 (2021).
Mazaheri et al., Ameliorating effect of osteopontin on $H(2)O(2)$-induced apoptosis of human oligodendrocyte progenitor cells. Cell Mol Neurobiol. 38(4):891-899 (2018).
McDowall et al., The role of activins and follistatins in skin and hair follicle development and function. Cytokine Growth Factor Rev. 19(5-6):415-426 (2008).
McQuillin et al., Case-control studies show that a non-conservative amino-acid change from a glutamine to arginine in the P2RX7 purinergic receptor protein is associated with both bipolar- and unipolar-affective disorders. Molecular Psychiatry 14:614-620 (2008).
Messa, Genevieve E. et al. Treatment of a Recurrent Ischial Ulcer With Injected Exosomes. Journal of Surgical Case Reports 2022(6):rjac271, 1-3 (2022).
Mokbel et al., Homing and efficacy of intra-articular injection of autologous mesenchymal stem cells in experimental chondral defects in dogs. Clin Exp Rheumatol 29:275-284 (2011).
Monsel et al.: Mesenchymal Stem Cell Derived Secretome and Extracellular Vesicles for Acute Lung Injury and Other Inflammatory Lung Diseases. Expert Opin Biol Ther. 16(7):859-871 (2016).
Murphy et al., Stem cell therapy in a caprine model of osteoarthritis. Arthritis Rheum 48:3464-3474 (2003).
Needleman, Saul B, and Christian D Wunsch. A General Method Applicable to the Search for Similarities in the Amino Acid Sequence of Two Proteins. Journal of Molecular Biology 48(3):443-453 (1970).
Nguyen et al., Functional outcomes of arthroscopic capsular release of the elbow. Arthroscopy 22(8):842-849 (2006).
Ning et al., SNP@lincTFBS: an integrated database of polymorphisms in human LincRNA transcription factor binding sites. PLoS One 9(7):e103851, 1-8 (2014).
Novikov A.V. Experimental and clinical use of multipotent mesenchymal stem cells to stimulate articular cartilage regeneration. Journal of Medicine 3:125-135 (2017).
Ohsu: Emergency Medicine Newsletter https://www.ohsu.edu/sites/default/files/2024-03/March%202024%20Newsletter%20%28Long%29.pdf (Mar. 2024).
Osborn et al.: A novel extracellular vesicle paradigm for the treatment of COVID-19 induced acute respiratory distress syndrome (ARDS). Respirator Medicine Case Reports. 51:102087 (2024).
Oyanguren-Desez et al., Gain-of-function of P2X7 receptor gene variants in multiple sclerosis. Cell Calcium 50(5):468-472 (2011).
Paicius, Rick. et al. Safety and Efficacy of Intravenous ExoFlo in the Treatment of Complex Regional Pain Syndrome. Pain Physician 26(7):E851-E857 (2023).
Park et al., Hair growth stimulated by conditioned medium of adipose-derived stem cells is enhanced by hypoxia: evidence of increased growth factor secretion. Biomed Res. 31(1):27-34 (2010).
Patton, Mary C. et al. Hypoxia Alters the Release and Size Distribution of Extracellular Vesicles in Pancreatic Cancer Cells to Support Their Adaptive Survival. Journal of cellular biochemistry 121(1):828-839 (2021).
PCT/US2016/022629 International Preliminary Report on Patentability dated Sep. 28, 2017.
PCT/US2016/022629 International Search Report and Written Opinion dated Aug. 25, 2016.
PCT/US2019/068615 International Search Report and Written Opinion dated Mar. 26, 2020.
PCT/US2020/012359 International Search Report and Written Opinion dated Mar. 24, 2020.
PCT/US2020/015982 International Preliminary Report on Patentability dated Aug. 12, 2021.
PCT/US2020/015982 International Search Report and Written Opinion dated Apr. 24, 2020.
PCT/US2020/017341 International Search Repot and Written Opinion dated Apr. 28, 2020.
PCT/US2020/018821 International Search Report and Written Opinion dated May 21, 2020.
PCT/US2020/030476 International Search Report and Written Opinion dated Aug. 12, 2020.
PCT/US2020/042762 International Preliminary Report on Patentability dated Jan. 27, 2022.
PCT/US2020/042762 International Search Report and Written Opinion dated Dec. 10, 2020.
PCT/US2021/028686 International Search Report and Written Opinion dated Aug. 16, 2021.
PCT/US2023/065115 International Search Report and Written Opinion dated Sep. 27, 2023.
PCT/US2024/019725 International Search Report and Written Opinion dated Jun. 28, 2024.
PCT/US2024/019725 Invitation to Pay Additional Fees dated May 7, 2024.
PCT/US2024/026444 International Search Report and Written Opinion dated Jul. 15, 2024.
PCT/US2024/033022 International Search Report and Written Opinion dated Sep. 3, 2024.
PCT/US2024/033123 International Search Report and Written Opinion dated Sep. 17, 2024.
Pearson, William R, and David J Lipman. Improved Tools For Biological Sequence Comparison. PNAS USA 85(8):2444-2448 (1988).
Pettine et al., Autogenous bone marrow concentrate for the treatment of osteoarthritis of the knee, hip and shoulder in former NFL players. J Stem Cell Res Ther. 4(1):9-13 (2018).
Pettine et al., Percutaneous injection of Autologous bone marrow concentrate significantly reduces lumbar discogenic pain through twelve months. Stem Cells 33:146-156 (2015).
Pettine et al., The biologic treatment of osteoarthritis with mesenchymal stem cell exosomes: the future is now. J Stem Cell Res Dev Ther. S1001:1-5 (2019).
Pettine et al., Tibial metaphyseal injection with bone marrow concentrate to treat knee arthritis. American J Stem Cell Res Ther. 2(1):5-10 (2018).
Pettine et al.: Treating Discogenic Pain with Mesenchymal Stem Cell Exosomes: What Is the Biologic Mechanism of Action. Jacobs Journal of Bone Marrow and Stem Cell Research. 5(1):017 (2019).
Philippon et al., The hip fluid seal-part I: the effect of an acetabularlabral tear, repair, resection, and reconstruction on hip fluid pressurization. Knee Surg Sports Traumatol Arthrosc. 22(4):722-729 (2014).
Phillips et al.: One month safety study of ExoFlo injection for the treatment of lumbar or cervical radiculopathy in the epidural space. International Journal of Science and Research Archive. 119-124 eISSN:2582-8185 (2021).
Phinney et al.: MSC-Derived Exosomes for Cell-Free Therapy. Stem Cells. 35:851-858 (2017).
Pietersz et al., Antibody conjugates for the treatment of cancer. Immunological Reviews 129(1):57-80 (1992).
Qian et al., Vacuum therapy prevents corporeal veno-occlusive dysfunction and penile shrinkage in a cavernosal nerve injured rat model. Asian J Androl. 22(3):274-279 (2020).

(56) References Cited

OTHER PUBLICATIONS

Rajan et al., Cannabidiol activates neuronal precursor genes in human gingival mesenchymal stromal cells. Journal of Cellular Biochemistry 118(6):1531-1546 (2016).
Rhee, Sung-Mi et al. Injectable Tissue-engineered Soft Tissue for Tissue Augmentation. Journal of Korean Medical Science 29(Suppl3): S170-S175 (2014).
Roffler et al., Anti-neoplastic glucuronide prodrug treatment of human tumor cells targeted with a monoclonal antibody-enzyme conjugate. Biochemical Pharmacology 42(10):2062-2065 (1991).
RU2021122946 Examination Report dated Sep. 16, 2024.
Russian Patent Application No. 2021122956/10 Search Report issued on Jul. 6, 2023.
Saldanha-Araujo et al.: Mesenchymal Stem Cells: A New Piece in the Puzzle of COVID-19 Treatment. Frontiers in Immunology. 11:1563. (2020).
Salisbury et al.: SNP and haplotype variation in the human genome. Mutat Res 526(1-2):53-61 (2003).
Sasaki, Gordon H. Clinical Use of Extracellular Vesicles in the Management of Male and Female Pattern Hair Loss: A Preliminary Retrospective Institutional Review Board Safety and Efficacy Study. Aesthetic Surgery Journal. Open Forum 4:ojac045, 1-15 (2022).
Savoie et al., Arthroscopic management of the arthritic elbow: indications, technique, and results. Journal of Shoulder and Elbow Surgery 8(3):214-219 (1999).
Seldes et al., Anatomy, histologic features, and vascularity of the adult acetabular labrum. Clin Orthop Relat Res 2001(382):232-240 (2001).
Sengupta et al.: Exosomes Derived from Bone Marrow Mesenchymal Stem Cells as Treatment for Severe COVID-19. Stem Cells and Development. 29(12):747-754 (2020).
Sengupta et al.: Response to Lim et al. re "Exosomes Derived from Bone Marrow Mesenchymal Stem Cells as Treatment for Severe COVID-19". Stem Cells and Development. 29(14):879-881 (2020).
Senter et al., Generation of 5-fluorouracil from 5-fluorocytosine by monoclonal antibody- cytosine deaminase conjugates. Bioconjugate Chemistry 2(6):447-451 (1991).
Senter et al., Generation of cytotoxic agents by targeted enzymes. Bioconjugate Chemistry 4(1):3-9 (1993).
Sheinkop et al.: Intra-Articular Injection of an Extracellular Vesicle Isolate Product to Treat Hip Osteoarthritis. International Journal of Recent Scientific Research. 10(12A):36230-36232 (2019).
Shen et al., Four genetic variants interact to confer susceptibility to atopic dermatitis in Chinese Han population. Molecular Genetics and Genomics 290(4):1493-1498 (2015).
Singaporean Application No. 11202106836U Written Opinion dated Dec. 19, 2022.
Sivalingam et al., Single-nucleotide polymorphisms of the interleukin-18 gene promoter region in rheumatoid arthritis patients: protective effect of AA genotype. Tissue Antigens 62:498-504 (2003).
Skovronova, Renata et al. Surface marker expresion in small and medium/large mesenchymal stromal cell-derived extracellular vesicles in naive or apoptotic condition using orthogonal techniques. bioRxiv. 1-32 (2021).
Smith et al., Isolation and implantation of autologous equine mesenchymal stem cells from bone marrow into the superficial digital flexor tendon as a potential novel treatment. Equine Vet J 35(1):99-102 (2003).
Smith et al., Mesenchymal stem cell therapy in equine tendinopathy. Disabil Rehabil 30:20-22, 1752-1758 (2008).
Smith, Temple F, and WATERMAN Michael S. Comparison of Biosequences. Advances in applied mathematics 2(4):482-489 (1981).
Spencer, Paige S, and Jose M Barral. Genetic Code Redundancy and Its Influence on the Encoded Polypeptides. Computational and Structural Biotechnology Journal 1:e201204006, 1-8 (2012).
Stevanato et al.: Investigation of Content, Stoichiometry and Transfer of miRNA from Human Neural Stem Cell Line Derived Exomes. PLoS ONE. 11(1):e0146353 (2016).
Suarez-Faritias et al., Alopecia areata profiling shows TH1, TH2, and IL-23 cytokine activation without parallel TH17/TH22 skewing. J Allergy Clin Immunol. 136(5):1277-1287 (2015).
Sun, JiaYang et al. The healing effects of conditioned medium derived from mesenchymal stem cells on radiation-induced skin wounds in rats. Cell transplantation 28(1):105-115 (2019).
Talegaonkar, The Role of Human MSC Derived Exosomes in the Treatment of Periodontal Diseases, Master's Thesis (2017).
Tamimi et al., Breast cancer susceptibility loci and mammographic density. Breast Cancer Research 10:R66 [1-9] (2008).
Thelen et al., Depending on its nano spacing, ALCAM promotes cell attachment and axon growth. PLoS One 7(12):e40493 (2012).
Toh et al., Advances in mesenchymal stem cell-based strategies for cartilage repair and regeneration. Stem Cell Reviews and Reports 10(5):686-696 (2014).
Toh, et al. MSC exosome as a cell-free MSC therapy for cartilage regeneration: Implications for osteoarthritis treatment. Seminars in Cell & Developmental Biology 67:56-64 (2017).
U.S. Appl. No. 17/418,342 Office Action dated Mar. 12, 2024.
U.S. Appl. No. 17/418,342 Office Action dated Sep. 5, 2024.
U.S. Appl. No. 17/420,500 Office Action dated Jul. 18, 2024.
U.S. Appl. No. 17/427,192 Office Action dated Apr. 17, 2024.
U.S. Serial No. 17/432, 138 Office Action dated Feb. 15, 2024.
U.S. Appl. No. 17/606,514 Office Action dated Sep. 16, 2024.
U.S. Appl. No. 17/628,011 Office Action dated Jun. 24, 2024.
Vanamee et al., Structural principles of tumor necrosis factor superfamily signaling. Sci Signal. 11(511):eaao4910 (2018).
Vangsness et al., Adult human mesenchymal stem cells delivered via intra-articular injection to the knee following partial medial meniscectomy: a randomized, double-blind controlled study. J Bone Joint Surg Am. 96(2):90-98 (2014).
Vizoso et al.: Mesenchymal Stem CellSecretome: Toward Cell-Free Therapeutic Strategies in Regenerative Medicine.Int. J. Mol. Sci. 18:1852 (2017).
Vogel et al.: Clinical Practice Guideline for the Management of Anorectal Abscess, Fistula-in- Ano, and Rectovaginal Fistula. Dis Colon Recturm. 59(12):1117-1133 (2016).
Vuckovic et al., Cannabinoids and pain: new insights from old molecules. Front Pharmacol. 9:1259 (2018).
Wang, et al. Exosomes from embryonic mesenchymal stem cells alleviate osteoarthritis through balancing synthesis and degradation of cartilage extracellular matrix. Stem Cell Res Ther 8(1):189, 1-13 (2017).
Wang et al., Macrophages induce AKT/beta-catenin-dependent Lgr5(+) stem cell activation and hair follicle regeneration through TNF. Nat Commun. 8:14091 (2017).
Wang et al., Upregulation of neuregulin-1 reverses signs of neuropathic pain in rats. Int J Clin Exp Pathol. 7(9):5916-5921 (2014).
Wang, Jiaqi et al. Exosomes: A Novel Strategy for Treatment and Prevention of Diseases. Frontiers in Pharmacology 8:300, 1-13 (2017).
Website: https://www.youtube.com/watch?v=0RtcsA5MQPs (2019).
Website: https://www.youtube.com/watch?v=8nvgzHzBRP0 (2021).
Website: https://www.youtube.com/watch?v=dNkcd3x1HBY (2020).
Website: https://www.youtube.com/watch?v=RaV2s6x-clg (2020).
Website: https://www.youtube.com/watch?v=V606jT6aHH0 (2021).
Weiss et al.: Letter to the Editor. Response to Sengupta et al. Stem Cells and Development. 29(24):1533-1534 (2020).
Wesselius et al., Association of P2X7 receptor polymorphisms with bone mineral density and osteoporosis risk in a cohort of Dutch fracture patients. Osteoporosis International 24(4):1235-1246 (2012).
Wilson, James E et al. Safety of Bone Marrow Derived Mesenchymal Stem Cell Extracellular Vesicle Injection for Lumbar Facet Joint Pain. Regenerative Medicine 19(1):19-26 (2024).
Yan et al., The platelet-derived growth factor receptor/STAT3 signaling pathway regulates the phenotypic transition of corpus cavernosum smooth muscle in rats. PLoS One 12(2):e0172191 (2017).
Yang et al., Cannabidiol regulates gene expression in encephalitogenic T cells using histone methylation and noncoding RNA during experimental autoimmune encephalomyelitis. Sci Rep. 9(1):15780 (2019).

(56) References Cited

OTHER PUBLICATIONS

Yang et al., Effect of mesenchymal stem cells in autoimmune arthritis. Eur. J. Med. 34:130-137 (2018).
Yap, Chloe X et al. Dissection of Genetic Variation and Evidence for Pleiotropy in Male Pattern Baldness. Nature communications 9(1):5407, 1-12 (2018).
Yepes, M. Urokinase-type plasminogen activator is a modulator of synaptic plasticity in the central nervous system: implications for neurorepair in the ischemic brain. Neural Regen Res. 15(4):620-624 (2020).
Yu et al.: Exosomes Derived from Bone Marrow Mesenchymal Stem Cells as Treatment for Severe COVID-19. Stem Cells & Dev. 29(12):747-754. doi:10.1089/scd.2020.0080 (2020).
Yu et al.: Exosomes Derived from Mesenchymal Stem Cells. Int. J. Mol. Sci. 15:4142-4157 (2014) doi:10.3390/ijms15034142.
Zhang, et al. Exosomes derived from human embryonic mesenchymal stem cells promote osteochondral regeneration. Osteoarthritis Cartilage 24(12):2135-2140 (2016).
Zhang et al., MSC exosomes mediate cartilage repair by enhancing proliferation, attenuating apoptosis and modulating immune reactivity. Biomaterials 156:16-27 (2018).
Zhao et al., NLRP3 inflammasome activation plays a carcinogenic role through effector cytokine IL-18 in lymphoma. Oncotarget 8(65):108571-108583 (2017).
Zhao et al., Stem cells for thetreatment of knee osteoarthritis: a comprehensive review. Pain Physician 21:229-241 (2018).
Zhou et al., Cross-talk between interferon-gamma and interleukin-18 in melanogenesis. J Photochem Photobiol B. 163:133-143 (2016).
Zhou et al., Effects of adipose-derived stem cells plus insulin on erectile function in streptozotocin-induced diabetic rats. Int Urol Nephrol. 48(5):657-669 (2016).
Zhou et al., Interleukin-18 augments growth ability of primary human melanocytes by PTEN inactivation through the AKT/NF-KB pathway. Int J Biochem Cell Biol. 45:308-331 (2013).
Zhu, et al. Comparison of exosomes secreted by induced pluripotent stem cell-derived mesenchymal stem cells and synovial membrane-derived mesenchymal stem cells for the treatment of osteoarthritis. Stem Cell Res Ther 8(1):64, 1-11 (2017).
Zinoviev et al.: Clinical evaluation of the effectiveness of mesenchymal stem cells in thermal burns. Bulletin of the National Medical and Surgical Center named after N.A. Pirogov. 13(4):Abstract (2018).
Zuker, M., On Finding All Suboptimal Foldings of an RNA Molecule. Science 244(4900):48-52 (1989).
Attur, Mukundan et al. Interleukin 1 receptor antagonist (IL1RN) gene variants predict radiographic severity of knee osteoarthritis and risk of incident disease. Annals of the rheumatic diseases 79(3):400-407 (2020). Published online Dec. 18, 2019.
Baberg, Falk et al. Secretome analysis of human bone marrow derived mesenchymal stromal cells. Biochimica et Biophysica Acta (BBA)-Proteins and Proteomics 1867(4):434-441 (2019).
Bracho-Sanchez, Evelyn et al. Suppression of local inflammation via galectin-anchored indoleamine 2, 3-dioxygenase. Nature biomedical engineering 7(9):1156-1169 (2023).
Bruno, Stefania et al. Mesenchymal stem cell-derived microvesicles protect against acute tubular injury. Journal of the American Society of Nephrology 20(5):1053-1067 (2009).
Budhiparama, Nicolaas C. et al. The role of genetic polymorphisms of interleukin-1 (IL-1R1 and IL-1RN) in primary knee osteoarthritis in Indonesia. Scientific reports 13(1):7967, 1-10 (2023).
Bustos, Martha L. et al. Activation of human mesenchymal stem cells impacts their therapeutic abilities in lung injury by increasing interleukin (IL)-10 and IL-1RN levels. Stem cells translational medicine 2(11):884-895 (2013).
Cai, L. et al. A slow release formulation of insulin as a treatment for osteoarthritis. Osteoarthritis and Cartilage 10(9):692-706 (2002).
Cai, Yu et al. Anti-inflammatory and chondroprotective effects of platelet-derived growth factor-BB on osteoarthritis rat models. The Journals of Gerontology: Series A 78(1):51-59 (2023).
Chia, Shi-Lu et al. Fibroblast growth factor 2 is an intrinsic chondroprotective agent that suppresses ADAMTS-5 and delays cartilage degradation in murine osteoarthritis. Arthritis & rheumatism: official Journal of the American College of rheumatology 60(7):2019-2027 (2009).
Ciavarella, Sabino et al. A peculiar molecular profile of umbilical cord-mesenchymal stromal cells drives their inhibitory effects on multiple myeloma cell growth and tumor progression. Stem cells and development 24(12):1457-1470 (2015).
Cook, Andrew D. et al. Granulocyte-macrophage colony-stimulating factor is a key mediator in experimental osteoarthritis pain and disease development. Arthritis research & therapy 14(5):R199, 1-9 (2012).
Dankbar, Berno. et al. Hepatocyte growth factor induction of macrophage chemoattractant protein-1 and osteophyte-inducing factors in osteoarthritis. Journal of orthopaedic research 25(5):569-577 (2007).
Federal Register. Vol. 76, No. 27 (2011): p. 7166.
François, Moïra et al. Human MSC suppression correlates with cytokine induction of indoleamine 2, 3-dioxygenase and bystander M2 macrophage differentiation. Molecular therapy 20(1):187-195 (2012).
Hamilton, John L. et al. Targeting VEGF and Its Receptors for the Treatment of Osteoarthritis and Associated Pain. Journal of bone and mineral research : the official journal of the American Society for Bone and Mineral Research 31(5):911-924 (2016).
Handayani, Erika Yusticia, and Heri Krisnata Ginting. Osteoarthritis and Hypothyroidism: What's the Association? A Literature Review. Asian Journal of Healthy and Science 3(6):113-119 (2024).
Haynesworth, Stephen E. et al. Cytokine expression by human marrow-derived mesenchymal progenitor cells in vitro: Effects of dexamethasone and IL-1α. Journal of cellular physiology 166(3):585-592 (1996).
Kiener, Hans P et al. Tumor necrosis factor α promotes the expression of stem cell factor in synovial fibroblasts and their capacity to induce mast cell chemotaxis. Arthritis & Rheumatism: Official Journal of the American College of Rheumatology 43(1):164-174 (2000).
Knights, Alexander J. et al. Synovial macrophage diversity and activation of M-CSF signaling in post-traumatic osteoarthritis. bioRxiv :1-29 (2023).
Kordelas, L. et al. MSC-derived Exosomes: A Novel Tool to Treat Therapy-refractory Graft-versus-host Disease. Leukemia 28(4):970-973 (935-979) (2014).
Li, Chengxin. et al. Association of thyroid hormone with osteoarthritis: from mendelian randomization and RNA sequencing analysis. Journal of Orthopaedic Surgery and Research 19(1):429, 1-11 (2024).
Li, Yun-Xuan et al. FGF1 reduces cartilage injury in osteoarthritis via regulating AMPK/Nrf2 pathway. Journal of Molecular Histology 54(5):427-438 (2023).
Lightner, Amy L. et al. Mesenchymal Stem Cell Extracellular Vesicles as a New Treatment Paradigm in Solid Abdominal Organ Transplantation: A Case Series. Stem Cells and Development. 33(5-6):107-115 (2024).
Lin, Shih-Chao et al. Microencapsulated recombinant human epidermal growth factor ameliorates osteoarthritis in a murine model. Evidence-Based Complementary and Alternative Medicine 2021(1):9163279, 1-10 (2021).
Lin, WeiYu et al. Function of CSF1 and IL34 in Macrophage Homeostasis, Inflammation, and Cancer. Frontiers in immunology 10:2019, 1-18 (2019).
Luo, Shi-Xing et al. Genetic polymorphisms of interleukin-16 and risk of knee osteoarthritis. PloS one 10(5):e0123442, 1-12 (2015).
Luo, Ziwei et al. IL16 Regulates Osteoarthritis Progression as a Target Gene of Novel-miR-81. Cartilage 15(2):175-183 (2024). Published online Apr. 21, 2023.
Massicotte, F. et al. Can altered production of interleukin-1β, interleukin-6, transforming growth factor-β and prostaglandin E2 by isolated human subchondral osteoblasts identify two subgroups of osteoarthritic patients. Osteoarthritis and cartilage 10(6):491-500 (2002).
Massicotte, Frederic et al. Modulation of insulin-like growth factor 1 levels in human osteoarthritic subchondral bone osteoblasts. Bone 38(3):333-341 (2006). Published online Oct. 27, 2005.

(56) References Cited

OTHER PUBLICATIONS

Muratovic, Dzenita et al. Elevated levels of active Transforming Growth Factor β1 in the subchondral bone relate spatially to cartilage loss and impaired bone quality in human knee osteoarthritis. Osteoarthritis and cartilage 30(6):896-907 (2022).
Nagao, Masashi et al. Vascular endothelial growth factor in cartilage development and osteoarthritis. Scientific reports 7(1):13027, 1-16 (2017).
Nakamura, Yoshihiro et al. Mesenchymal-stem-cell-derived exosomes accelerate skeletal muscle regeneration. FEBS letters 589(11):1257-1265 (2015).
Papadopoulos, Konstantinos I. et al. Novel use of intraarticular granulocyte colony stimulating factor (hG-CSF) combined with activated autologous peripheral blood stem cells mobilized with systemic hG-CSF: safe and efficient in early osteoarthritis. Cartilage 13(1_suppl):1671S-1674S (2021).
Papathanasiou, Ioanna et al. Bone morphogenetic protein-2-induced Wnt/β-catenin signaling pathway activation through enhanced low-density-lipoprotein receptor-related protein 5 catabolic activity contributes to hypertrophy in osteoarthritic chondrocytes. Arthritis research & therapy 14(2):R82, 1-14 (2012).
Park, Hang-soo et al. Human BM-MSC secretome enhances human granulosa cell proliferation and steroidogenesis and restores ovarian function in primary ovarian insufficiency mouse model. Scientific reports 11(1):4525, 1-12 (2021).
Partain, Brittany D. et al. Intra-articular delivery of an indoleamine 2, 3-dioxygenase galectin-3 fusion protein for osteoarthritis treatment in male Lewis rats. Arthritis Research & Therapy 25(1):173, 1-15 (2023).
Ragni, Enrico et al. Secreted factors and extracellular vesicles account for the immunomodulatory and tissue regenerative properties of bone-marrow-derived mesenchymal stromal cells for osteoarthritis. Cells 11(21):3501, 1-21 (2022).
Rodriguez-Fontenla, Cristina et al. Association of a BMP5 microsatellite with knee osteoarthritis: case-control study. Arthritis Research & Therapy 14(6):R257, 1-8 (2012).
Roman-Blas, Jorge A. et al. Osteoarthritis associated with estrogen deficiency. Arthritis research & therapy 11(5):241, 1-14 (2009).
Shao, Yan et al. BMP5 silencing inhibits chondrocyte senescence and apoptosis as well as osteoarthritis progression in mice. Aging (albany NY) 13(7):9646-9664 (2021).
Shen, Jie. TGF-beta signaling and the development of osteoarthritis. Bone research 2(1):1-7 (2014).
Sugimoto, K.: Basic knowledge of ultrasonography in sports injury and trauma. Medical Technology. 43(5):440-444 (2015).
Ueshima et al.: Imaging Diagnosis of Hip Diseases-Diagnostic Imaging of Glenohumeral Labrum Injuries. MB Orthop. 26(5):191-197 (2013).
U.S. Appl. No. 17/427,192 Office Action dated Oct. 28, 2024.
Usmani, Shirine E. et al. Transforming growth factor-alpha induces endothelin receptor A expression in osteoarthritis. Journal of Orthopaedic Research 30(9): 1391-1397 (2012).
Usmani, Shirine E. The Role of Transforming Growth Factor Alpha in Osteoarthritis and Skeletal Development. Electronic Thesis and Dissertation Repository (2012).
Van Helvoort, E M. et al. The Role of Interleukin-4 and Interleukin-10 in Osteoarthritic Joint Disease: A Systematic Narrative Review. Cartilage 13(2):19476035221098167, 1-14 (2022).
Von Kaeppler, Ericka P. et al. Interleukin 4 promotes anti-inflammatory macrophages that clear cartilage debris and inhibits osteoclast development to protect against osteoarthritis. Clinical immunology 229:108784, 1-10 (2021).
Wang, Hai-jun et al. Suppression of experimental osteoarthritis by adenovirus-mediated double gene transfer. Chinese medical journal 119(16):1365-1373 (2006).
Watkins, Linda R. et al. Targeted interleukin-10 plasmid DNA therapy in the treatment of osteoarthritis: Toxicology and pain efficacy assessments. Brain, behavior, and immunity 90:155-166 (2020).
Wen, Caining et al. Insulin-like growth factor-1 in articular cartilage repair for osteoarthritis treatment. Arthritis research & therapy 23(1):277, 1-9 (2021).
Wilkins, James M. et al. Association of a functional microsatellite within intron 1 of the BMP5 gene with susceptibility to osteoarthritis. BMC medical genetics 10:141, 1-10 (2009).
Ye, Hantao et al. MST1 knockdown inhibits osteoarthritis progression through Parkin-mediated mitophagy and Nrf2/NF-ΚB signalling pathway. Journal of cellular and molecular medicine 28(11):e18476, 1-15 (2024).
Zafranskaya, M. et al. PGE2 contributes to in vitro MSC-mediated inhibition of non-specific and antigen-specific T cell proliferation in MS patients. Scandinavian journal of immunology 78(5):455-462 (2013).
Zhao, Xiaoyi et al. RNA-seq characterization of histamine-releasing mast cells as potential therapeutic target of osteoarthritis. Clinical Immunology 244:109117 (2022).
Zhu, Pengfei et al. Recombinant platelet-derived growth factor-BB alleviates osteoarthritis in a rat model by decreasing chondrocyte apoptosis in vitro and in vivo. Journal of Cellular and Molecular Medicine 25(15):7472-7484 (2021).
Zohora, Fatema Tuz et al. Secretome-based acellular therapy of bone marrow-derived mesenchymal stem cells in degenerative and immunological disorders: a narrative review. Heliyon 9(7):e18120, 1-20 (2023).
Kim, Soochong et al. Insulin-like growth factor-1 regulates platelet activation through PI3-K alpha isoform. Blood, The Journal of the American Society of Hematology 110(13):4206-4213 (2007).
KR10-2022-7004073 Office Action dated Jan. 30, 2025.
U.S. Appl. No. 17/418,342 Office Action dated Dec. 30, 2024.
U.S. Appl. No. 17/420,500 Office Action dated Jan. 30, 2025.
Abraham et al.: Mesenchymal stem cell-derived extracellular vesicles for the treatment of acute respiratory distress syndrome. Stem Cells Transl Med. 9(1):28-38 (2019).
Australian Examination Report No. 2 for standard patent application No. 2021261384 dated Mar. 27, 2025.
Bari et al.: Mesenchymal Stromal Cell Secretome for Severe COVID-19 Infections: Premises for the Therapeutic Use. Cells. 9(924):1-5 (2020).
Chinese Clinical Trial Registry ChiCTR2000030261. A Study for the key technology of mesenchymal stem cells exosomes atomization in the treatment of novel coronavirus phnumonia (COVID019). Record Version as of Feb. 26, 2020.
Hazehara-Kunitomo, Yuri. et al. Acidic Pre-conditioning Enhances the Stem Cell Phenotype of Human Bone Marrow Stem/progenitor Cells. International Journal of Molecular Sciences 20(5):1097, 1-10 (2019).
Howell, T. Howard et al. A Phase I/II Clinical Trial to Evaluate a Combination of Recombinant Human Platelet-derived Growth Factor-BB and Recombinant Human Insulin-like Growth Factor-I in Patients with Periodontal Disease. Journal of Periodontology 68(12):1186-1193 (1997).
Liu et al.: Therapeutic potential of mesenchymal stem/stromal cell-derived secretome and vesicles for lung injury and disease. Expert Op Biol Ther. 29(2):125-140 (2019).
Logozzi, Mariantonia et al. Microenvironmental pH and Exosome Levels Interplay in Human Cancer Cell Lines of Different Histotypes. Cancers 10(10):370, 1-15 (2018).
Pourakbari, Ramin. et al. The potential of exosomes in the therapy of the cartilage and bone complications; emphasis on osteoarthritis. Life Sciences 236:116861, 1-8 (2019).
Tamama, Kenichi, and Svetoslava S Kerpedjieva. Acceleration of Wound Healing by Multiple Growth Factors and Cytokines Secreted from Multipotential Stromal Cells/Mesenchymal Stem Cells. Advances in Wound Care 1(4):177-182 (2012).
U.S. Appl. No. 17/429,553 Office Action dated Feb. 27, 2025.
U.S. Appl. No. 17/606,514 Office Action dated Mar. 4, 2025.
Colombo, Marina et al. Biogenesis, secretion, and intercellular interactions of exosomes and other extracellular vesicles. Annual Review of Cell and Developmental Biology 30:255-289 (2014).
Co-pending Appl. Serial No. PCT/US2024/054785 Application as Filed Nov. 6, 2024.

(56) References Cited

OTHER PUBLICATIONS

Co-pending Appl. Serial No. PCT/US2024/054793 Application as Filed Nov. 6, 2024.
Co-pending Appl. Serial No. PCT/US2024/054794 Application as Filed Nov. 6, 2024.
Co-pending U.S. Appl. No. 18/988,110 Claims as of Dec. 19, 2024.
Co-pending U.S. Appl. No. 19/098,197 Claims as of Apr. 2, 2025.
Co-pending U.S. Appl. No. 19/205,490 Claims as of May 12, 2025.
Co-pending U.S. Appl. No. 19/256,922 Claims as of Jul. 1, 2025.
Derkus, Burak. et al. A new approach in stem cell research-Exosomes: Their mechanism of action via cellular pathways. Cell Biol 41(5):466-475 (2017).
English, Karen. Mechanisms of Mesenchymal Stromal Cell Immunomodulation. Immunology and Cell Biology 91(1):19-26 (2013).
Fujii et al. Supporting Information 1—Graft-Versus-Host Disease Amelioration by Human Bone Marrow Mesenchymal Stromal/Stem Cell-Derived Extracellular Vesicles Is Associated with Peripheral Preservation of Naive T Cell Populations. Stem Cells 36:S1-S8 (2018). Retrieved Mar. 26, 2025. Retrieved from https://academic.oup.com/stmcls/article/36/3/434/6453146.
Fujii et al. Supporting Information 4—Graft-Versus-Host Disease Amelioration by Human Bone Marrow Mesenchymal Stromal/Stem Cell-Derived Extracellular Vesicles Is Associated with Peripheral Preservation of Naive T Cell Populations. Stem Cells 36:S1-S12 (2018). Retrieved Mar. 26, 2025. Retrieved from https://oup.silverchair-cdn.com/oup/backfile/Content_public/Journal/stmcls/36/3/10.1002_stem.2759/3/stmcls_36_3_434_s4.pdf?Expires=1746031876&Signature=zoiTnyJVT2n9ym04KWxmsHCnG5aS5E~WHzOk86JRdwkGFmxoVaJK1p7sHSwPNi1ehXRchoDy8MJ6FtIW-oofP082YLQx7R9ix7WNXLS8v324bKPK5SNiQlo5HRayd1BKmRqM44ibeZX1M2U3OT08wAECghSqPw~flKEnY0UtLLXrlkNMGues8ff1hlixE4UjM2KvRFGqTkGUVVQWtmBvdkfW~IEtayDhmBuGqnc3qXLQVMYMNH8PsAe8hT~i5uoDccQ9z7WQMdh5olw1BYE1S-onq-42K7Zgv3Gp9-5z~9j1c6LFTm2ySQ3HUPDBS6AY3PZgA80MeudUFbQN5ZJ4LA_&Key-Pair-Id=APKAIE5G5CRDK6RD3PGA.
Fujii, Sumie et al. Graft-Versus-Host Disease Amelioration by Human Bone Marrow Mesenchymal Stromal/Stem Cell-Derived Extracellular Vesicles Is Associated with Peripheral Preservation of Naive T Cell Populations. Stem Cells 36(3):434-445 (2018).
Furuta, Taisuke et al. Mesenchymal Stem Cell-Derived Exosomes Promote Fracture Healing in a Mouse Model. Stem Cells Translational Medicine 5(12):1620-1630 (2016).
Lee, et al. Hypoxic conditioned medium from mesenchymal stem cells promotes lymphangiogenesis by regulation of mitochondrial-related proteins. Stem Cell Research & Therapy 7:38, 1-11 (2016).
PCT/US2024/054785 International Search Report and Written Opinion dated Apr. 16, 2025.
PCT/US2024/054785 Invitation to Pay Additional Fees with Partial International Search Report dated Feb. 24, 2025.
U.S. Appl. No. 17/606,514 Office Action dated Jun. 25, 2025.
Australian Application No. 2019276713 Examination report No. 2 dated Sep. 16, 2025.
Baldari et al.: Challenges and Strategies for Improving the Regenrative Effects of Mesenchymal Stromal Cell-Based Therapies. Int J Mol Sci. 18(10):2087 (2017).
Rosov et al.: Hypoxic preconditioning results in increased motility and improved therapeutic potential of human mesechymal stem cells. Stem Cells. 26(8):2173-82 (2008).

\* cited by examiner

MESENCHYMAL STEM CELL (MSC) GROWTH FACTOR AND EXTRACELLULAR VESICLE PREPARATION IN FROZEN OR POWDERED FORM AND METHODS OF USE

This is a national stage application filed under 35 U.S.C. § 371 of PCT International Application No. PCT/US2019/026595, filed Apr. 9, 2019, entitled "A GROWTH FACTOR AND EXTRACELLULAR VESICLE FROZEN OR POWDERED ADDITIVE COMPRISING A MESENCHYMAL STEM CELL (MSC) PREPARATION AND METHODS OF USE," which claims the benefit of U.S. Provisional Application No. 62/677,744, filed on May 30, 2018; U.S. Provisional Application No. 62/681,172, filed on Jun. 6, 2018; U.S. Provisional Application No. 62/688,012, filed on Jun. 21, 2018; and U.S. Provisional Application No. 62/698,673, filed on Jul. 16, 2018 applications which are incorporated herein by reference in their entirety.

I. BACKGROUND

1. Mesenchymal stem cells (MSC) are multipotent cells that have the ability to differentiate into a multitude of cell types including myocytes, chondrocytes, adipocytes, and osteoblasts. Typically, these cells can be found in the placenta, umbilical cord blood, adipose tissue, bone marrow, amniotic fluid or perivascular tissue. It has been long recognized that MSC, in addition to their differentiation potential, have the immunomodulatory abilities resulting in the expression of many different cytokines, growth factors and extracellular vesicles. Because of these effects, adoptive transfer of autologous or allogeneic MSCs obtained from bone marrow concentrate, adipose derived vascular fraction, or post-natal products including cord blood, placenta, periosteum, or amnion have been used to treat wounds, inflammatory conditions, autoimmune diseases, autoinflammatory diseases, graft versus host disease, and sepsis. However, these treatments involve the transfer of cells and therefore suffer from therapeutic loss from attrition of the transferred cells and possibly need for tissue matching of the donor and recipients. What are needed are new acellular MSC-derived products that can provide the benefits of autogenous and allogeneic cellular MSC-derived products without the drawbacks associated with transplanted cellular therapies.

II. SUMMARY

2. Disclosed are methods and compositions related to mesenchymal stem cell (MSC) secretome compositions (including MSC-derived growth factor, exosomes, extracts, and/or extracellular vesicle comprising compositions) and methods of their use.

3. In one aspect, disclosed herein are MSC secretome compositions (including, but not limited to MSC growth factor, MSC exosome, MSC extracts and/or extracellular vesicle comprising compositions) for use in the treatment of skin disorders, wounds, and orthopedic or spinal treatments, said compositions comprising a growth factor powdered additive comprising a mesenchymal stem cell (MSC) preparation selected from the group consisting of MSC growth factors, MSC exosomes, MSC extracellular vesicles, and/or MSC extracts; and a composition base; wherein the growth factors and extracellular matrix are obtained from cells selected from the group consisting of human MSCs, animal MSCs, and fibroblast-like cells; and wherein the MSC preparation comprises at least one member selected from the group consisting of cells cultured under standard hyperoxyic culturing conditions (for example, 21% oxygen) and cells cultured under artificial wound healing conditions (such as, for example, 0.1% to about 20.9% oxygen in the presence of inflammatory cytokines, angiogenic factors, and reduced glucose). In one aspect, the MSC secretome compositions (including, but not limited to MSC growth factor, MSC exosome, MSC extracts and/or extracellular vesicle comprising compositions) can be frozen or powdered via lyophilization. In one aspect, the MSC secretome compositions (including, but not limited to MSC growth factor and extracellular vesicle compositions and including frozen and/or lyophilized powdered compositions) can further comprise a protective coating (such as, for example, a cryoprotectant oligosaccharide and a protein solution) to reduce degradation of the growth factors and extracellular vesicles.

4. Also disclosed herein are sponges, scaffolds, stents, matrixes, grafts adhesive bandages, wound dressings, surgical drapes, sutures, salves, creams, or wound adhesives comprising a therapeutically effective amount of the MSC secretome compositions (including, but not limited to MSC growth factor, MSC exosome, MSC extracts and/or extracellular vesicle comprising compositions and including frozen and/or lyophilized powdered compositions) of any preceding aspect.

5. In one aspect, disclosed herein are methods of treating a wound, skin disorder, orthopedic disorder, orthopedic injury, spinal disorder, or spinal injury in a subject comprising administering to the subject the MSC secretome compositions (including, but not limited to MSC growth factor, MSC exosome, MSC extracts and/or extracellular vesicle comprising compositions and including frozen and/or lyophilized powdered compositions) of any preceding aspect. For example, disclosed herein are methods of treating a wound, skin disorder, orthopedic disorder, orthopedic injury, spinal disorder, or spinal injury in a subject comprising administering to the subject a composition comprising a MSC secretome compositions (including, but not limited to MSC growth factor, MSC extract, MSC exosome, and/or extracellular vesicle comprising compositions and including frozen and/or lyophilized powdered compositions) comprising a mesenchymal stem cell (MSC) preparation selected from the group consisting of MSC growth factors, MSC exosomes, extracellular vesicles, and MSC extracts and a composition base; wherein the growth factors and extracellular matrix are obtained from cells selected from the group consisting of human MSCs, animal MSCs, and fibroblast-like cells; wherein the MSC preparation comprises at least one member selected from the group consisting of cells cultured under standard hyperoxyic culturing conditions and cells cultured under artificial wound healing conditions.

6. Also disclosed herein are method of preparing an MSC additive (including, but not limited to a frozen or powdered additive) for use in an MSC preparation to be a component of a MSC secretome compositions (including, but not limited to MSC growth factor and extracellular vesicle comprising compositions and including frozen and/or lyophilized powdered compositions) of any preceding aspect, said method comprising: a) obtaining MSCs; b) culturing the MSCs under standard hyperoxyic culturing conditions or artificial wound healing hypoxic conditions; c) stimulating the cultured MSCs to selectively secrete anti-inflammatory proteins, peptides, cytokines, chemokines, glycosaminoglycans, extracellular matrix (ECM), proteoglycans, exosomes, and secretomes forming a conglomerate mixture; and d) encapsulating the conglomerate mixture. In some aspects, the MSCs in the conglomerate mixture are can be intact or lysed prior to being encapsulated in step d.

7. In one aspect, disclosed herein are methods of preparing an MSC additive (including, but not limited to a frozen or powdered additive) of any preceding aspect for use in an MSC preparation to be a component of MSC secretome compositions (including, but not limited to MSC growth factor, MSC exosome, MSC extracts and/or extracellular vesicle comprising compositions and including frozen and/or lyophilized powdered compositions) of any preceding aspect, further comprising freezing the conglomerate mixture after encapsulation. In one aspect, the methods can further comprise lyophilizing or freeze-drying the frozen conglomerate and encapsulated mixture.

III. BRIEF DESCRIPTION OF THE DRAWINGS

8. The accompanying drawings, which are incorporated in and constitute a part of this specification, illustrate several embodiments and together with the description illustrate the disclosed compositions and methods.

9. FIG. 1 shows nanoparticle tracking analysis (NTA) of extracellular vesicles from MSC media. NTA is a method for visualizing and analyzing nanometer sized particles in liquids that uses Brownian motion to determine particle size and concentration of extracellular vesicles from MSC media.

Figure 2:
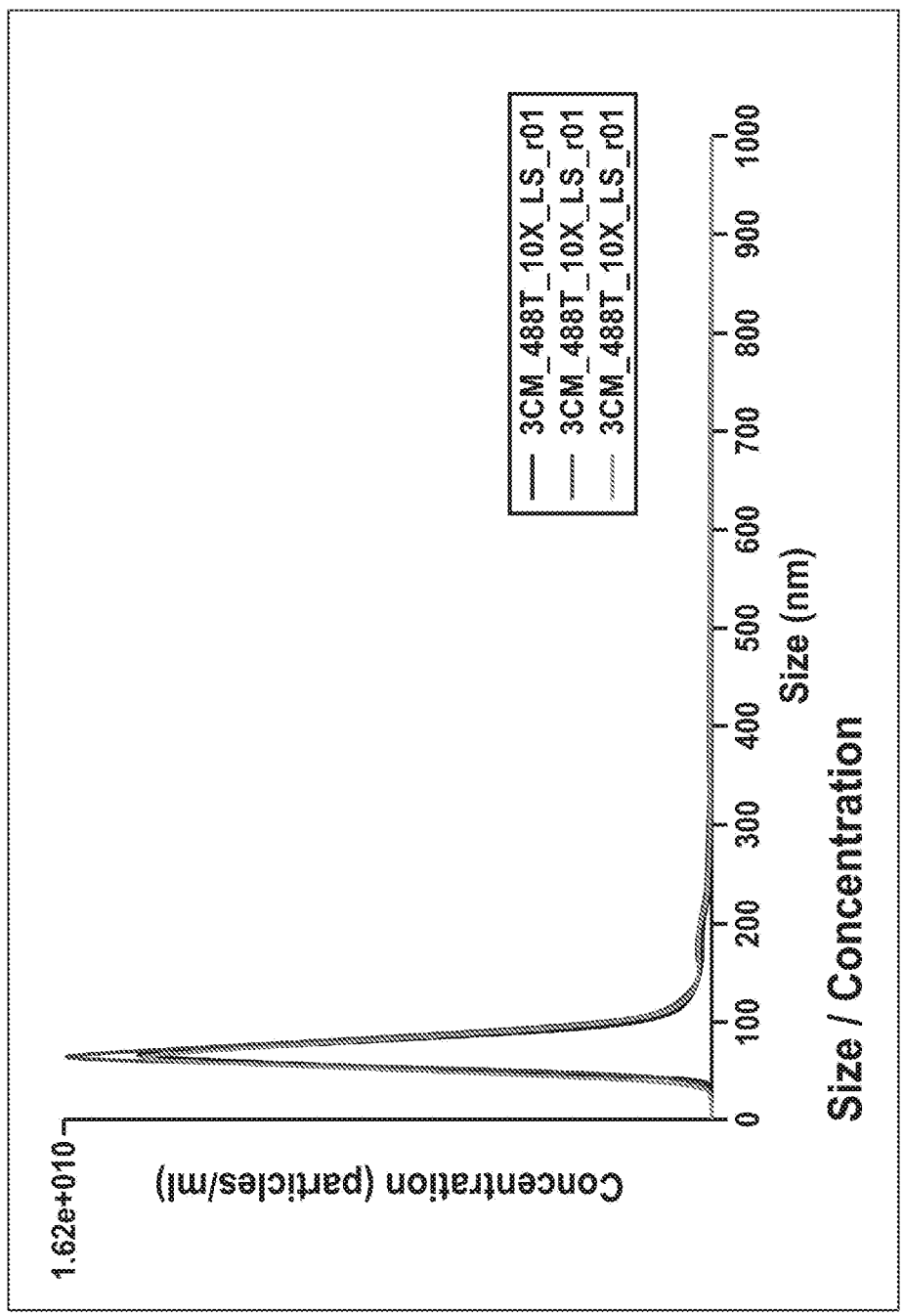

10. FIG. 2 shows exosomes evaluated my fluorescence microscopy displaying particle size and concentration.

IV. DETAILED DESCRIPTION

11. In the following detailed description of the invention, numerous details, examples, and embodiments of the invention are described. However, it will be clear and apparent to one skilled in the art that the invention is not limited to the embodiments set forth and that the invention can be adapted for any of several applications.

12. Before the present compounds, compositions, articles, devices, and/or methods are disclosed and described, it is to be understood that they are not limited to specific synthetic methods or specific recombinant biotechnology methods unless otherwise specified, or to particular reagents unless otherwise specified, as such may, of course, vary. It is also to be understood that the terminology used herein is for the purpose of describing particular embodiments only and is not intended to be limiting.

A. Definitions

13. As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

14. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

15. The term "subject" is defined herein to include animals such as mammals, including, but not limited to, primates (e.g., humans), cows, horses, pigs, sheep, goats, dogs, cats, rabbits, rats, mice and the like. In some embodiments, the subject is a human.

16. "Administration" to a subject includes any route of introducing or delivering to a subject an agent. Administration can be carried out by any suitable route, including oral, topical, intravenous, subcutaneous, transcutaneous, transdermal, intramuscular, intra-joint, parenteral, intra-arteriole, intradermal, intraventricular, intracranial, intraperitoneal, intralesional, intranasal, rectal, vaginal, by inhalation, via an implanted reservoir, parenteral (e.g., subcutaneous, intravenous, intramuscular, intra-articular, intra-synovial, intrasternal, intrathecal, intraperitoneal, intrahepatic, intralesional, and intracranial injections or infusion techniques), and the like. "Concurrent administration", "administration in combination", "simultaneous administration" or "administered simultaneously" as used herein, means that the compounds are administered at the same point in time or essentially immediately following one another. In the latter case, the two compounds are administered at times sufficiently close that the results observed are indistinguishable from those achieved when the compounds are administered at the same point in time. "Systemic administration" refers to the introducing or delivering to a subject an agent via a route which introduces or delivers the agent to extensive areas of the subject's body (e.g. greater than 50% of the body), for example through entrance into the circulatory or lymph systems. By contrast, "local administration" refers to the introducing or delivery to a subject an agent via a route which introduces or delivers the agent to the area or area immediately adjacent to the point of administration and does not introduce the agent systemically in a therapeutically significant amount. For example, locally administered agents are easily detectable in the local vicinity of the point of administration but are undetectable or detectable at negligible amounts in distal parts of the subject's body. Administration includes self-administration and the administration by another.

17. "Biocompatible" generally refers to a material and any metabolites or degradation products thereof that are generally non-toxic to the recipient and do not cause significant adverse effects to the subject.

18. "Comprising" is intended to mean that the compositions, methods, etc. include the recited elements, but do not exclude others. "Consisting essentially of" when used to define compositions and methods, shall mean including the recited elements, but excluding other elements of any essential significance to the combination. Thus, a composition consisting essentially of the elements as defined herein would not exclude trace contaminants from the isolation and purification method and pharmaceutically acceptable carriers, such as phosphate buffered saline, preservatives, and the like. "Consisting of" shall mean excluding more than trace elements of other ingredients and substantial method steps for administering the compositions of this invention. Embodiments defined by each of these transition terms are within the scope of this invention.

19. A "control" is an alternative subject or sample used in an experiment for comparison purposes. A control can be "positive" or "negative."

20. "Controlled release" or "sustained release" refers to release of an agent from a given dosage form in a controlled fashion in order to achieve the desired pharmacokinetic profile in vivo. An aspect of "controlled release" agent delivery is the ability to manipulate the formulation and/or dosage form in order to establish the desired kinetics of agent release.

21. "Effective amount" of an agent refers to a sufficient amount of an agent to provide a desired effect. The amount of agent that is "effective" will vary from subject to subject, depending on many factors such as the age and general condition of the subject, the particular agent or agents, and the like. Thus, it is not always possible to specify a quantified "effective amount." However, an appropriate "effective amount" in any subject case may be determined by one of ordinary skill in the art using routine experimentation. Also, as used herein, and unless specifically stated otherwise, an "effective amount" of an agent can also refer to an amount covering both therapeutically effective amounts and prophylactically effective amounts. An "effective amount" of an agent necessary to achieve a therapeutic effect may vary according to factors such as the age, sex, and weight of the subject. Dosage regimens can be adjusted to provide the optimum therapeutic response. For example, several divided doses may be administered daily, or the dose may be proportionally reduced as indicated by the exigencies of the therapeutic situation.

22. A "decrease" can refer to any change that results in a smaller gene expression, protein production, amount of a symptom, disease, composition, condition, or activity. A substance is also understood to decrease the genetic output of a gene when the genetic output of the gene product with the substance is less relative to the output of the gene product without the substance. Also, for example, a decrease can be a change in the symptoms of a disorder such that the symptoms are less than previously observed. A decrease can be any individual, median, or average decrease in a condition, symptom, activity, composition in a statistically significant amount. Thus, the decrease can be a 1, 2, 3, 4, 5, 6, 7, 8, 9, 10, 15, 20, 25, 30, 35, 40, 45, 50, 55, 60, 65, 70, 75, 80, 85, 90, 95, or 100% decrease so long as the decrease is statistically significant.

23. "Inhibit," "inhibiting," and "inhibition" mean to decrease an activity, response, condition, disease, or other biological parameter. This can include but is not limited to the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

24. The terms "prevent," "preventing," "prevention," and grammatical variations thereof as used herein, refer to a method of partially or completely delaying or precluding the onset or recurrence of a disease and/or one or more of its attendant symptoms or barring a subject from acquiring or reacquiring a disease or reducing a subject's risk of acquiring or reacquiring a disease or one or more of its attendant symptoms.

25. "Pharmaceutically acceptable" component can refer to a component that is not biologically or otherwise undesirable, i.e., the component may be incorporated into a pharmaceutical formulation of the invention and administered to a subject as described herein without causing significant undesirable biological effects or interacting in a deleterious manner with any of the other components of the formulation in which it is contained. When used in reference to administration to a human, the term generally implies the component has met the required standards of toxicological and manufacturing testing or that it is included on the Inactive Ingredient Guide prepared by the U.S. Food and Drug Administration.

26. "Pharmaceutically acceptable carrier" (sometimes referred to as a "carrier") means a carrier or excipient that is useful in preparing a pharmaceutical or therapeutic composition that is generally safe and non-toxic and includes a carrier that is acceptable for veterinary and/or human pharmaceutical or therapeutic use. The terms "carrier" or "pharmaceutically acceptable carrier" can include, but are not limited to, phosphate buffered saline solution, water, emulsions (such as an oil/water or water/oil emulsion) and/or various types of wetting agents. As used herein, the term "carrier" encompasses, but is not limited to, any excipient, diluent, filler, salt, buffer, stabilizer, solubilizer, lipid, stabilizer, or other material well known in the art for use in pharmaceutical formulations and as described further herein.

27. "Pharmacologically active" (or simply "active"), as in a "pharmacologically active" derivative or analog, can refer to a derivative or analog (e.g., a salt, ester, amide, conjugate, metabolite, isomer, fragment, etc.) having the same type of pharmacological activity as the parent compound and approximately equivalent in degree.

28. "Therapeutic agent" refers to any composition that has a beneficial biological effect. Beneficial biological effects include both therapeutic effects, e.g., treatment of a disorder or other undesirable physiological condition, and prophylactic effects, e.g., prevention of a disorder or other undesirable physiological condition (e.g., a non-immunogenic cancer). The terms also encompass pharmaceutically acceptable, pharmacologically active derivatives of beneficial agents specifically mentioned herein, including, but not limited to, salts, esters, amides, proagents, active metabolites, isomers, fragments, analogs, and the like. When the terms "therapeutic agent" is used, then, or when a particular agent is specifically identified, it is to be understood that the term includes the agent per se as well as pharmaceutically acceptable, pharmacologically active salts, esters, amides, proagents, conjugates, active metabolites, isomers, fragments, analogs, etc.

29. "Polymer" refers to a relatively high molecular weight organic compound, natural or synthetic, whose structure can be represented by a repeated small unit, the monomer. Non-limiting examples of polymers include polyethylene, rubber, cellulose. Synthetic polymers are typically formed by addition or condensation polymerization of monomers. The term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers. The term "polymer" encompasses all forms of polymers including, but not limited to, natural polymers, synthetic polymers, homopolymers, heteropolymers or copolymers, addition polymers, etc.

30. "Therapeutically effective amount" or "therapeutically effective dose" of a composition (e.g. a composition comprising an agent) refers to an amount that is effective to achieve a desired therapeutic result. In some embodiments, a desired therapeutic result is the control of type I diabetes. In some embodiments, a desired therapeutic result is the control of obesity. Therapeutically effective amounts of a given therapeutic agent will typically vary with respect to factors such as the type and severity of the disorder or disease being treated and the age, gender, and weight of the subject. The term can also refer to an amount of a therapeutic agent, or a rate of delivery of a therapeutic agent (e.g., amount over time), effective to facilitate a desired therapeutic effect, such as pain (i.e., nociception) relief. The precise desired therapeutic effect will vary according to the condition to be treated, the tolerance of the subject, the agent and/or agent formulation to be administered (e.g., the potency of the therapeutic agent, the concentration of agent in the formulation, and the like), and a variety of other factors that are appreciated by those of ordinary skill in the art. In some instances, a desired biological or medical response is achieved following administration of multiple dosages of the composition to the subject over a period of days, weeks, or years.

31. In this specification and in the claims which follow, reference will be made to a number of terms which shall be defined to have the following meanings:

32. "Optional" or "optionally" means that the subsequently described event or circumstance may or may not occur, and that the description includes instances where said event or circumstance occurs and instances where it does not.

33. Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

B. Compositions

34. Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular MSC secretome composition is disclosed and discussed and a number of modifications that can be made to a number of molecules including the MSC secretome composition are discussed, specifically contemplated is each and every combination and permutation of the MSC secretome composition and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

35. While existing autogenous and allogeneic mesenchymal stem cells (MSCs) contained within bone marrow concentrate or adipose-derived stromal vascular fraction (SVF) or various post-natal products from umbilical cord, placenta or amnion, expanded MSC cultures are currently being used to treat wounds, orthopedic pathology, and spine pathology; the existing treatments do not contain large amounts of MSC secretomes (including, but not limited to growth factors, cytokines, chemokines, exosomes, extracellular vesicles, and/or extracts). Additionally, despite evidence in the art that treatments comprising stem cells (including injectable treatments) can help prevent aging and treat scarring, uneven pigmentation, existing skin products, such as creams, lotions, serums, make-up, and the like, while including ingredients that potentially help treat and strengthen the skin, other topical products do not penetrate the epidermis and more importantly do not include human MSCs, or MSC-derived growth factors and proteins. In fact, prior to the present disclosure an active MSC growth factor product that can be used for these applications has not been developed. Thus, in one aspect, disclosed herein are MSC secretome compositions (including, but not limited to MSC growth factor, MSC exosome, MSC extracts and/or extracellular vesicle comprising compositions) for use in the treatment of wounds, orthopedic disorders, orthopedic injuries, ophthalmology, spinal injury, or spinal disorders, said treatment compositions comprising (i) a growth factor powdered additive comprising a mesenchymal stem cell (MSC) derived preparation and (ii) a pharmaceutically acceptable carrier.

36. As noted above, MSC are multipotent cells that have the ability to differentiate into a multitude of cell types including myocytes, chondrocytes, adipocytes, and osteoblasts. Typically, these cells can be found in the placenta, umbilical cord blood, adipose tissue, bone marrow, or amniotic fluid, including perivascular tissue. As used herein, "MSC" refers to non-terminally differentiated cells including but not limited to multipotential stem cell, multipotential stromal cell, stromal vascular cells, pericytes, perivascular cells, stromal cells, pluripotent cells, multipotent cells, adipose-derived fibroblast-like cells, adipose-derived stromal vascular fraction, adipose-derived MSC, bone marrow-derived fibroblast-like cells, bone marrow-derived stromal vascular fraction, bone marrow-derived MSC, tissue-derived fibroblast-like cells, adult stem cells, adult stromal cells, keratinocytes, and/or melanocytes.

37. It has been long recognized that MSC, in addition to their differentiation potential, have the immunomodulatory abilities resulting in the expression of many different cytokines and growth factors. As used herein, a "MSC preparation" or "MSC secretome composition" refers to a composition comprising MSC growth factors, MSC exosomes, extracellular vesicles, or acellular extracts of MSCs or MSC lysates obtained from human MSCs, fibroblast-like cells, and non-human animal MSCs including, but not limited to MSCs from horses, cows, pigs, sheep, non-human primates, dogs, cats, rabbits, rats, and mice. In embodiments, the MSCs may be derived from the patient to which the composition will be applied (autologous) or derived from another individual (allogeneic). The MSCs may be culture expanded to collect the conditioned media or to increase the quantity of cells for the lysate or used freshly prior to incorporation into the composition of the present disclosure.

38. The MSC secretome compositions (including, but not limited to MSC growth factor, MSC exosome, MSC extracts and/or extracellular vesicle comprising compositions) may comprise about 0.00001 to about 20 wt. %, such as from about 0.01 to about 10 wt. %, of a mesenchymal stem cell (MSC) extract, MSC exosome, or MSC growth factor preparation. The MSC preparation may comprise either MSC conditioned media or MSC lysate from cell culture expanded MSCs. In some embodiments, the composition may further comprise from about 0.01 to about 10 wt. % of a cell-free medium conditioned by growth of MSCs or MSC lineage cells, wherein the cells are cultured under normal hyperoxyic culturing conditions or under artificial wound healing conditions.

39. As disclosed herein the MSCs used to produce the disclosed MSC additives (including growth factor secretome composition either frozen or powdered additives) can be selectively stimulated to produce MSC growth factors, secretomes, cytokines, chemokines, mesenchymal stem cell proteins, peptides, glycosaminoglycans, extracellular matrix (ECM), proteoglycans, secretomes, and exosomes. As used herein, MSC growth factors include but are not limited to prostaglandin E2 (PGE2), transforming growth factor β1 (TGF-β1), hepatocyte growth factor (HGF), stromal cell derived factor-1 (SDF-1), nitric oxide, indoleamine 2,3-dioxygenase, interleukin-4 (IL-4), IL-6, interleukin-10 (IL-10), IL-1 receptor antagonist and soluble TNF-α receptor, insulin-like growth factors, fibroblast growth factors (FGF) 1-23 (especially, FGF1 and FGF2), bone morphogenetic proteins (BMPs) 1-15, epidermal growth factor (EGF), transforming growth factor-α (TGF-α) macrophage-stimulating protein (MSP), platelet derived growth factor (PLGF), vascular endothelial growth factor (VEGF), macrophage colony stimulating factor (M-CSF), insulin, granulocyte colony stimulating factor (G-CSF), granulocyte macrophage colony stimulating factor (GM-CSF), as well as hormones including estrogen, and thyroid hormones.

40. In one aspect, it is understood and herein contemplated that the growth conditions such as temperature, oxygen tension, pH, glucose saturation, confluency, and growth surface can affect the gene expression and protein production of cells growing in culture and thereby can result in different growth factors and cytokines being produced (see Table 1). For example, growth surface stiffness (Young's Modulus) affects the gene expression and protein production of the cells growing on it. Adipose cells and cartilage cells are usually maintained on a softer and more elastic growth surface (~10 kPa-12 kPa), while bone cells are better grown on a stiff surface (~$10^6$-$12^6$ kPa). By adjusting the surface stiffness, it is possible to influence the secretomes of the cells and their communication signals (growth factors, exosomes, cytokines and chemokines).

TABLE 1

Growth conditions effecting growth factor secretion

| Growth Factor | Growth Conditions | Wound Conditions |
| --- | --- | --- |
| BMP-5 | ↑ | ↑↑ |
| EGF | ↑ | ↑↑ |
| FGF | ↑↑ | ↑↑ |
| HGF | ↑ | ↑↑ |
| IL-4 | ↑ | ↑↑↑ |
| IL-10 | ↑ | ↑↑ |
| IL-16 | ↑ | ↑↑ |
| IL-6 | ↑ | ↑↑ |
| SCF1 | ↑ | ↑↑ |
| TIMP | ↑↑ | ↑↑↑ |
| VEGF | ↑ | ↑↑↑ |

The Environment created in the culture system can affect the secretomes and specific growth factor production. Environmental changes such as substrate elastic modulus, temperature, cell confluency, nutrient supply and various combinations can affect these changes.

41. In one aspect, the MSC preparation (such as, for example, a MSC secretome composition) comprises MSC growth factors, MSC exosomes, and/or cellular extracts of MSCs or MSC lysates obtained from MSCs cultured under standard hyperoxyic culturing conditions (for example, 21% oxygen) or MSCs cultured under artificial wound healing conditions (such as, for example, 0.1% to about 5% oxygen in the presence of inflammatory cytokines, angiogenic factors, and reduced glucose).

42. As disclosed herein artificial wound healing conditions simulate growth conditions in real wounds where there is a reduction in nutrient supply and reduction of waste removal that is usually caused by a disruption in local blood circulation. This creates a harsh environment for cells until new blood vessels are created and blood circulation is restored. Accordingly, artificial wound healing conditions used to culture MSCs can include one or more of the following growth conditions reduction in glucose availability, reduction in oxygen tension, reduction in pH, and increased temperature.

43. In one aspect, the glucose availability can be reduced relative to normal control. Modified culture media to reduce glucose, but not damage the cells can be between 0 and 50% reduction in glucose, more preferably between about 5% and 40% reduction in glucose. For example, MSC artificial wound healing culture conditions can comprise glucose reduction of about 1, 2, 3, 4, 5, 6,7,8 9, 10, 11, 12,13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% such as a glucose reduction from about 5% to about 15%, from about 10% to about 20%, from about 15% to about 25%, from about 20% to about 30%, or from about 25% to about 35%.

44. In one aspect, oxygen tension can be reduced to oxygen levels to hypoxic conditions. Normal atmospheric oxygen is approximately 21% and any reduction is considered hypoxic. Thus, in one aspect, MSCs can be cultured at between 0.0% and 20.9% oxygen, from about 0.1% to about 0.5% oxygen, from about 0.1% to about 2.0%, from about 0.1% to about 5.0% oxygen, from about 0.5% to 5.0%, from about 1.0% to about 10% oxygen, about 5.0% to about 10.0% oxygen; and from about 10.0% to about 15.0% under artificial wound healing conditions. Preferably during MSC would healing culture conditions oxygen tension is between about 0.5% and 20.5% oxygen, such as, for example, 0, 0.05, 0.1, 0.2, 0.3, 0.4, 0.5, 0.6, 0.7, 0.8, 0.9, 1.0, 1.1, 1.2, 1.3,1.4, 1.5, 1.6, 1.7, 1.7, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, or 20.5% oxygen.

45. The pH can also be reduced under artificial wound healing conditions. Physiologic pH is maintained very tightly and is usually very close to a neutral pH=7.2±0.2 (7.0-7.4). However, in a wound the acidic environment can have a pH=6.2±0.2 (i.e., a pH from 6.0 to about 6.4). Thus, under artificial wound healing culture conditions, pH can be from about 6.0 to about 7.4, for example, from 6.0 to about 6.4, from about 6.2 to about 6.4, from about 6.2 to about 6.6, from about 6.4 to about 6.6, from about 6.4 to about 6.8, or from about 6.6 to about 7.0, such as 6.0, 6.1, 6.2, 6.3, 6.4, 6.5, 6.6, 6.7, 6.8, 6.9, 7.0, 7.1, 7.2, 7.3 or 7.4.

46. Under artificial wound healing culture conditions, the temperature of the culture environment may be raised to simulate temperature increases at the site of a wound. Physiologic homeostasis temperature is maintained at 37° C. (98.6° F.). A slight increase or decrease can cause significant changes to cellular metabolism. By increasing the temperature above 37° C. to any temperature up to about 40° C. (104° F.) can create an "feverous" environment. Thus, in on aspect, the artificial wound healing culture conditions for the MSCs can comprise from about 35° C. to about 39° C., from about 35° C. to about 36° C., from about 36° C. to about 37° C., from about 37° C. to about 38° C., from about 38° C. to about 39° C., from about 39° C. to about 40° C. In one aspect, the temperature of the artificial wound healing culture can be 35.0, 35.1, 35.2, 35.3, 36.4, 35.5, 35.6, 35.7, 35.8, 35.9, 36.0, 36.1, 36.2, 36.3, 36.4, 36.5, 36.6, 36.7, 36.8, 36.9, 37.0,.37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0° C.

47. In one aspect, the MSC secretome compositions (including, but not limited to MSC growth factor, MSC exosome, MSC extracts and/or extracellular vesicle comprising compositions) can further comprise a protective coating (such as, for example, a cryoprotectant oligosaccharide and a protein solution) to reduce degradation of the growth factors. It is understood and herein contemplated that the protective coating can be engineered as a polymer. "Polymer" refers to a relatively high molecular weight organic compound, natural or synthetic, whose structure can be represented by a repeated small unit, the monomer. Non-limiting examples of polymers include polyethylene, rubber, cellulose. Synthetic polymers are typically formed by addition or condensation polymerization of monomers. The term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers. The term "polymer" encompasses all forms of polymers including, but not limited to, natural polymers, synthetic polymers, homopolymers, heteropolymers or copolymers, addition polymers, etc. In one aspect, the gel matrix can comprise copolymers, block copolymers, diblock copolymers, and/or triblock copolymers.

48. In one aspect, the protective coating can comprise a biocompatible polymer. In one aspect, biocompatible polymer can be crosslinked. Such polymers can also serve to slowly release the adipose browning agent and/or fat modulating agent into tissue. As used herein biocompatible polymers include, but are not limited to polysaccharides; hydrophilic polypeptides; poly(amino acids) such as poly-L-glutamic acid (PGS), gamma-polyglutamic acid, poly-L-aspartic acid, poly-L-serine, or poly-L-lysine; polyalkylene glycols and polyalkylene oxides such as polyethylene glycol (PEG), polypropylene glycol (PPG), and poly(ethylene oxide) (PEO); poly(oxyethylated polyol); poly(olefinic alcohol); polyvinylpyrrolidone); poly(hydroxyalkylmethacrylamide); poly(hydroxyalkylmethacrylate); poly(saccharides); poly(hydroxy acids); poly(vinyl alcohol), polyhydroxyacids such as poly(lactic acid), poly(gly colic acid), and poly(lactic acid-co-glycolic acids); polyhydroxyalkanoates such as poly3-hydroxybutyrate or poly4-hydroxybutyrate; polycaprolactones; poly(orthoesters); polyanhydrides; poly(phosphazenes); poly(lactide-co-caprolactones); polycarbonates such as tyrosine polycarbonates; polyamides (including synthetic and natural polyamides), polypeptides, and poly(amino acids); polyesteramides; polyesters; poly(dioxanones); poly(alkylene alkylates); hydrophobic polyethers; polyurethanes; polyetheresters; polyacetals; polycyanoacrylates; polyacrylates; polymethylmethacrylates; polysiloxanes; poly(oxyethylene)/poly(oxypropylene) copolymers; polyketals; polyphosphates; polyhydroxyvalerates; polyalkylene oxalates; polyalkylene succinates; poly(maleic acids), as well as copolymers thereof. Biocompatible polymers can also include polyamides, polycarbonates, polyalkylenes, polyalkylene glycols, polyalkylene oxides, polyalkylene terephthalates, polyvinyl alcohols (PVA), methacrylate PVA (m-PVA), polyvinyl ethers, polyvinyl esters, polyvinyl halides, polyvinylpyrrolidone, polyglycolides, polysiloxanes, polyurethanes and copolymers thereof, alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulphate sodium salt, poly(methyl methacrylate), poly(ethylmethacrylate), poly(butylmethacrylate), poly(isobutylmethacrylate), poly(hexlmethacrylate), poly(isodecylmethacrylate), poly(lauryl methacrylate), poly(phenyl methacrylate), poly(methyl acrylate), poly(isopropyl acrylate), poly(isobutyl acrylate), poly(octadecyl acrylate), polyethylene, polypropylene, poly(ethylene glycol), poly(ethylene oxide), poly(ethylene terephthalate), poly(vinyl alcohols), poly(vinyl acetate, poly vinyl chloride polystyrene and polyvinylpryrrolidone, derivatives thereof, linear and branched copolymers and block copolymers thereof, and blends thereof. Exemplary biodegradable polymers include polyesters, poly(ortho esters), poly(ethylene amines), poly(caprolactones), poly(hydroxybutyrates), poly(hydroxyvalerates), polyanhydrides, poly(acrylic acids), polyglycolides, poly(urethanes), polycarbonates, polyphosphate esters, polyphospliazenes, derivatives thereof, linear and branched copolymers and block copolymers thereof, and blends thereof.

49. In some embodiments the protective coating comprises carbohydrate construction of monosaccharides as well as carbohydrate polymers such as disaccharides or polysaccharides including but not limited to non-reducing poly or disaccharides as well as any combination thereof. Examples of carbohydrates that can be used in the protective coating comprise Glucose, Aldoses (D-Allose, D-Altrose, D-Mannose, etc.), Glucopyranose, Pentahydroxyhexanal, α-D-Glucopyranosyl-D-glucose, α-D-Glucopyranosyl-dihydrate, Polymer of β-D-Glycopyranosyl units, β-D-Fructofuranosyl α-D-glucopyranoside (anhydrous/dihydrate), β-D-Galactopyranosyl-D-glucose, α-D-Glucopyranosyl-α-D-glucopyranoside (anhydrous/dihydrate), Galactose, Pentoses (Ribose, xylose, lyxose), Dextrose, Dodecacarbon monodecahydrate, Fructose, Sucrose, Lactose, Maltose, Trehalose, Agarose, D-galactosyl-β-(1-4)-anhydro-L-galactosyl, Cellulose, Polymer of β-D-Glycopyranosyl units, and Starch, as well as, Polyhydric alcohols, Polyalcohols, Alditols, Erythritol, Glycitols, Glycerol, Xylitol, and Sorbitol.

50. In some embodiments the protective coating contains biocompatible and/or biodegradable polyesters or polyanhydrides such as poly(lactic acid), poly(glycolic acid), and poly(lactic-co-glycolic acid). The particles can contain one more of the following polyesters: homopolymers including glycolic acid units, referred to herein as "PGA", and lactic acid units, such as poly-L-lactic acid, poly-D-lactic acid, poly-D,L-lactic acid, poly-L-lactide, poly-D-lactide, and poly-D,L-lactide5 collectively referred to herein as "PLA", and caprolactone units, such as poly(e-caprolactone), collectively referred to herein as "PCL"; and copolymers including lactic acid and glycolic acid units, such as various forms of poly(lactic acid-co-glycolic acid) and poly(lactide-co-glycolide) characterized by the ratio of lactic acid: glycolic acid, collectively referred to herein as "PLGA"; and polyacrylates, and derivatives thereof. Exemplary polymers also include copolymers of polyethylene glycol (PEG) and the aforementioned polyesters, such as various forms of PLGA-PEG or PLA-PEG copolymers, collectively referred to herein as "PEGylated polymers". In certain embodiments, the PEG region can be covalently associated with polymer to yield "PEGylated polymers" by a cleavable linker. In one aspect, the polymer comprises at least 60, 65, 70, 75, 80, 85, 89, 90, 91, 92, 93, 94, 95, 96, 97, 98, or 99 percent acetal pendant groups.

51. The triblock copolymers disclosed herein comprise a core polymer such as, example, polyethylene glycol (PEG), polyvinyl acetate, polyvinyl alcohol, polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA), cellulose derivatives, such as hydroxymethylcellulose, hydroxypropylcellulose and the like.

52. Examples of diblock copolymers that can be used in the protective coatings disclosed herein comprise a polymer such as, example, polyethylene glycol (PEG), polyvinyl acetate, polyvinyl alcohol (PVA), polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA).

53. In one aspect, the protective coating contains (i.e., the encapsulated, the encapsulated compositions can further comprise lecithin or hydrolyzed lecithin as a carrier or as encapsulation material. As used herein, lecithin and/or hydrolyzed lecithin coatings include coatings comprising phosphatidyl choline, phosphatidyl inositol, phosphatidyl ethanolamine, phosphatidylserine, and phosphatidic acid. Sources of the lecithin can be pnat or animal sources.

54. In one aspect, any of the polymers, monosaccharides, disaccharides, or polysaccharides used to form the protective coating formed by placing the MSC additive in a encapsulating solution can be at an appropriate concentration for form the protective coating. For example, polymers, monosaccharides, disaccharides, or polysaccharides can be at any concentration between 0.01 mM and 10.0M concentration, for example, from about 0.01M to about 0.1M, from about 0.1 mM to about 1.0M, from about 1.0M to about 10.0M. Exemplary concentrations include 0.01, 0.02, 0.03, 0.04, 0.05, 0.06, 0.07, 0.08, 0.09, 0.1, 0.2, 0.3, 0.4, 0.4, 0.6, 0.7, 0.8, 0.9, 1, 2, 3, 4, 5, 6, 7, 8, 9, 10, 20, 30, 40, 50, 60, 70, 80, 90, 100, 110, 120, 130, 140, 150, 160, 170, 180, 190, 200, 225, 250, 275, 300, 325, 350, 375, 400, 450, 500, 600, 700, 800, 900 mM, 1, 1.1, 1.2, 1.3, 1.4, 1.5, 1.6, 1.7, 1.8, 1.9, 2, 3, 4, 5, 6, 7, 8, 9, 10M.

55. As shown in FIGS. 1 and 2, the exosomses and extracellular vesicles in the disclosed MSC secretome compositions have been produced.

56. In one aspect, it is understood and herein contemplated that one way to treat a wound is through administration of the MSC secretome compositions (including, but not limited to MSC growth factor, MSC exosome, MSC extracts and/or extracellular vesicle comprising compositions) subcutaneously, intramuscularly, intravenously, topically (such as, for example, through the use of salves, creams, and/or ointments), but also by impregnating stents, sponges, matrixes, scaffolds, bandages, dressing, sutures, grafts, surgical drapes, surgical adhesive, and/or staples with the MSC secretome compositions. Thus, in one aspect, disclosed herein are medicated stents, scaffolds, sponges, matrixes, adhesive bandages, wound dressings, grafts, surgical drapes, sutures, salves, creams, or wound adhesives comprising a therapeutically effective amount of the MSC secretome composition. The MSC secretome compositions (including, but not limited to MSC growth factor, MSC exosome, MSC extracts and/or extracellular vesicle comprising compositions), as noted above, can be administered topically and applied to the face, the neck, the hands, or any other desired part of the body. When applied to an adhesive bandage, wound dressing, grafts, surgical drape, suture, scaffold, matrix, sponge, or stent, the MSC secretome composition can be a applied as a powder.

57. In one aspect, the MSC secretome compositions (including, but not limited to MSC growth factor, MSC exosome, MSC extracts and/or extracellular vesicle comprising compositions) disclosed herein may comprise any known ingredients typically found in the wound healing fields, such as oils, waxes or other standard fatty substances, or conventional gelling agents and/or thickeners; emulsifiers; moisturizing agents; emollients; sunscreens; hydrophilic or lipophilic active agents, such as ceramides; agents for combating free radicals; bactericides; sequestering agents; preservatives; basifying or acidifying agents; fragrances; surfactants; fillers; natural products or extracts of natural product, such as aloe or green tea extract; vitamins; or coloring materials. Other ingredients that may be combined with the powder may include an antioxidant, which can be selected from a variety of antioxidants. Suitable antioxidants include vitamins, such as Vitamin C (L-Ascorbate, Ascorbate-2 Phosphate magnesium salt, Ascorbyl Palmitate, Tetrahexyldecyl Ascorbate), Vitamin E (Tocotrienol), Vitamin A (retinol, retinal, retinoic acid, provitamin A carotenoids, such as beta-carotene), N-acetyl glucosamine, or other derivatives of glucosamine. Other ingredients may include at least one essential fatty acid, such as (2-3, (2-6, and 22-9 polyunsaturated fatty acids, such as linoleic acid (LA), gamma-linoleic acid (GLA), alpha-linoleic acid (ALA), dihomo-γ-linolenic acid (DGLA), arachidonic acid (ARA), and others. The fatty acids may be derived from various sources including evening primrose oil, black currant oil, borage oil, or GLA modified safflower seeds. Other ingredients may include a platelet rich fibrin matrix, at least one ingredient to support ECM production and production of hyaluronic acid, such as N-acetyl glucosamine or other derivatives of glucosamine, ultra-low molecular weight (ULMW) hyaluronic acid, chondroitin sulfate, or keratin sulfate.

58. It is understood and herein contemplated that the MSC secretome compositions disclosed herein can provide wound healing rejuvenation, augmentation, and improved or restored skin tissue. The composition may also be used as an injectable in the treatment of joint arthritis and degenerated spinal discs. Moreover, embodiments of the composition may not require the inclusion of additional growth factors or hormones, such as insulin, insulin-like growth factors, thyroid hormones, fibroblast growth factors, estrogen, retinoic acid, and the like. In some aspect, the disclosed stem cell growth factor compositions can comprise additional active ingredients including, but not limited to antibiotics, anti-acne agents, liposomes, antioxidants, platelet-rich fibrin matrixes, analgesic, anti-inflammatoires, as well as, additional growth factors, such as insulin, insulin-like growth factors, thyroid hormones, fibroblast growth factors, estrogen, retinoic acid, and the like. Such additional active ingredients can be mixed with the stem cell growth factor and extracellular vesicle compositions disclosed herein as well as MSC conditioned media, MSC lystates, and MSC-derived produces and then thawed or dissolved, mixed, or suspended in a mixture of emulsifying lanolin alcohols, waxes, and oils or a mixture of petrolatum or mineral oil, a quaternary ammonium compound, a fatty alcohol, and a fatty ester emollient, or lotions that are substantially similar in composition.

1. Pharmaceutical Carriers/Delivery of Pharmaceutical Products

59. As described above, the compositions can also be administered in vivo in a pharmaceutically acceptable carrier. By "pharmaceutically acceptable" is meant an excipient material that is not biologically or otherwise undesirable, i.e., the material may be administered to a subject, along with the nucleic acid, without causing any undesirable biological effects or interacting in a deleterious manner with any of the other components of the composition in which it is contained. The carrier would naturally be selected to minimize any degradation of the active ingredient and to minimize any adverse side effects in the subject, as would be well known to one of skill in the art.

60. The compositions may be administered orally, parenterally (e.g., intravenously), by intramuscular injection, by intraperitoneal injection, transdermally, extracorporeally, topically or the like, including topical intranasal administration or administration by inhalant. As used herein, "topical intranasal administration" means delivery of the compositions into the nose and nasal passages through one or both of the nares and can comprise delivery by a spraying mechanism, nebulizer, or droplet mechanism, or through aerosolization of the composition and/or excipient. Administration of the compositions by inhalant can be through the nose or mouth via delivery by a spraying or droplet mechanism. Delivery can also be directly to any area of the respiratory system (e.g., lungs) via nebulizer or intubation. The exact amount of the compositions required will vary from therapeutic application and subject to subject, depending on the species, age, weight and general condition of the subject, the severity of the allergic disorder being treated, the particular composition used, its mode of administration and the like. Thus, it is not possible to specify an exact amount for every composition. However, an appropriate amount can be determined by the treating physician or one of ordinary skill in the art using routine therapies given the teachings herein.

61. When provided as for topical administration, the composition can comprise a base for application of the therapeutic composition such as a lotion, a cream, a pigment, a sunscreen, an oil, a gel, a hydrogel, a powder, a salve an ointment, or the like. Such bases can include cosmetic bases such as foundations, facial masks, lip care products, hair care products, skin cleansers, and exfoliants, as well as ophthalmic ointments and drops. Additionally, the base can comprise additional ingredients such as an anti-acne agent, liposomes, an antioxidant, and a platelet-rich fibrin matrix, hyaluronic acid solution or applied to a thin film polymer sheet or resorbable poly-lactic acid film. Accordingly, in one aspect, disclosed herein are compositions for use in the treatment of wounds (including burns, abrasions and ulcers), orthopedic disorders, orthopedic injuries, spinal injury, or spinal disorders, said treatment compositions comprising (i) a MSC secretome composition (including, but not limited to MSC growth factor, MSC exosome, MSC extracts and/or extracellular vesicle comprising compositions and including frozen and/or lyophilized powdered compositions) comprising a mesenchymal stem cell (MSC) preparation and (ii) a pharmaceutical carrier, wherein the pharmaceutical carrier comprises a compositional base.

62. The MSC secretome compositions can be administered orally. For example, when prepared as a powder, the final powder of the MSC secretome composition may be added to a dietary supplement powder, such as milk whey protein, creatine, or hydrolyzed collagen from various sources, including bovine, porcine, or ovine skin, meniscus, or tendons or from marine algae. The mixture may be added to enzymatically created collagen peptides or to collagen gelatin from various sources. The ingredients may be homogenously combined as a stand-alone powder or combined into gelatin capsules, time release capsules or hydroxypropyl methylcellulose (HPMC) capsules or compressed into caplets or tablets for oral dietary consumption (PO). Thus, the MSC secretome composition can be used to treat dietary deficiencies or gut inflammation when combined with collagen or protein from bovine, porcine, ovine, or marine algae sources. When the stem cell growth composition (including, but not limited to MSC additive powder) is provided in a gelatin capsule, HPMC capsule or tablet form, the capsule or tablet may comprise from about 0.01 to about 10 wt. % of an MSC growth factor or extract preparation combined with collagen or protein powder. The MSC growth factors or extract preparation may or may not include expanded MSCs or their lysates. Embodiments may further comprise from about 0.01 to about 10 wt. % of cell-free conditioned culture medium secretome by growth of MSCs and/or MSC-lineage cells derived from human or animal sources.

63. Parenteral administration of the composition, if used, is generally characterized by injection. Injectables can be prepared in conventional forms, either as liquid solutions or suspensions, solid forms suitable for solution of suspension in liquid prior to injection, or as emulsions. A more recently revised approach for parenteral administration involves use of a slow release or sustained release system such that a constant dosage is maintained. See, e.g., U.S. Pat. No. 3,610,795, which is incorporated by reference herein.

a) Pharmaceutically Acceptable Carriers

64. The compositions, including excipients, can be used therapeutically in combination with an appropriate and pharmaceutically acceptable carrier.

65. Suitable carriers and their formulations are described in Remington: The Science and Practice of Pharmacy (19th ed.) ed. A. R. Gennaro, Mack Publishing Company, Easton, PA 1995. Typically, an appropriate amount of a pharmaceutically-acceptable salt is used in the formulation to render the formulation isotonic. Examples of the pharmaceutically-acceptable carrier include, but are not limited to, physiologic saline, Ringer's solution, lactated Ringer's solution and dextrose solution. The pH of the solution is preferably from about 5 to about 8, and more preferably from about 7 to about 7.5. Further carriers include sustained release preparations such as semipermeable matrices of solid hydrophobic polymers containing the antibody, which matrices are in the form of shaped articles, e.g., films, liposomes or microparticles. It will be apparent to those persons skilled in the art that certain carriers may be more preferable depending upon, for instance, the route of administration and concentration of composition being administered.

66. Pharmaceutical carriers are known to those skilled in the art. These most typically would be standard carriers for administration of drugs to humans, including solutions such as sterile water, physiologic saline, and buffered solutions at physiological pH. The compositions can be administered topically, intramuscularly or subcutaneously. Other compounds will be administered according to standard procedures used by those skilled in the art.

67. Pharmaceutical compositions may include carriers, thickeners, diluents, buffers, preservatives, surface active agents and the like in addition to the molecule of choice. Pharmaceutical compositions may also include one or more active ingredients such as antimicrobial agents, anti-inflammatory agents, anesthetics, and the like.

68. The pharmaceutical composition may be administered in a number of ways depending on whether local or systemic treatment is desired, and on the area to be treated. Administration may be topically (including ophthalmically, vaginally, rectally, intranasally), orally, by inhalation, or parenterally, for example by intravenous drip, subcutaneous, intraperitoneal or intramuscular injection. The disclosed composition can be administered intravenously, intraperitoneally, intramuscularly, subcutaneously, intracavity, or transdermally.

69. Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

70. Formulations for topical administration of the disclosed stem cell growth factor compositions may include ointments, lotions, creams, gels, drops, suppositories, sprays, liquids and powders. Conventional pharmaceutical carriers, aqueous, powder or oily bases, thickeners and the like may be necessary or desirable. In some aspects, the carrier can comprise a base comprising a mixture of emulsifying lanolin alcohols, waxes, and oils or a mixture of petrolatum or mineral oil, a quaternary ammonium compound, a fatty alcohol, and a fatty ester emollient. Alternatively, the base may comprise a cream comprising a mixture of emulsifying lanolin alcohols, water, petrolatum, glycerin, isostearyl palmitate, butylene glycol, glyceryl stearate, or a mixture thereof. In one aspect, the composition of the present disclosure may comprise an eye lash treatment and, thus, the cosmetic base may comprise a mixture of mineral oils, linseed oil, castor, *eucalyptus*, lanolin, beeswax, or a mixture thereof Including very small (<2%) amounts of preservative, coloring agent and/or perfume, and water if desired.

71. In some embodiments, the wound healing, orthopedic and spine base may be a carrier that may contain, for example, about 1 to about 20 wt. % of a humectant, about 0.1 to about 10 wt. % of a thickener and water. Alternatively, the carrier may comprise about 70 to about 99 wt. % of a surfactant, and about 0 to about 20 wt. % of a fat. The carrier may alternatively comprise about 80% to 99.9% of a thickener; about 5 to about 15% of a surfactant, about 2 to about15% of a humectant, about 0 to about 80% of an oil, very small (<2%) amounts of preservative, coloring agent and/or perfume, and water if desired.

72. In some aspects, the composition may further comprise a penetration enhancer to improve wound penetration of the bioactive substance. Suitable penetration enhancers may include dimethyl sulfoxide (DMSO), DMSO-like compounds, small molecular weight hyaluronic acid, ethanolic compounds, pyroglutamic acid esters, and the like.

73. Compositions for oral administration include powders or granules, suspensions or solutions in water or non-aqueous media, capsules, sachets, or tablets. Thickeners, flavorings, diluents, emulsifiers, dispersing aids or binders may be desirable.

74. Some of the compositions may potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

b) Therapeutic Uses

75. Effective dosages and schedules for administering the compositions may be determined empirically, and making such determinations is within the skill in the art. The dosage ranges for the administration of the compositions are those large enough to produce the desired effect in which the symptoms of the disorder can be affected. The dosage should not be so large as to cause adverse side effects, such as unwanted cross-reactions, anaphylactic reactions, and the like. Generally, the dosage will vary with the age, condition, sex and extent of the disease in the patient, route of administration, or whether other drugs are included in the regimen, and can be determined by one of skill in the art. The dosage can be adjusted by the individual physician in the event of a specific need or any counterindications. Dosage can vary, and can be administered in one or more dose administrations daily, for one or several days. Guidance can be found in the literature for appropriate dosages for given classes of pharmaceutical products. For example, guidance in selecting appropriate doses for antibodies can be found in the literature on therapeutic uses of antibodies, e.g., *Handbook of Monoclonal Antibodies*, Ferrone et al., eds., Noges Publications, Park Ridge, N.J., (1985) ch. 22 and pp. 303-357; Smith et al., *Antibodies in Human Diagnosis and Therapy*, Haber et al., eds., Raven Press, New York (1977) pp. 365-389. A typical daily dosage of the antibody used alone might range from about 1 µg/kg to up to 100 mg/kg of body weight or more per day, depending on the factors mentioned above. Additionally, information about dosages can be determined from studies conducted with stem cells as the therapy. These studies have a known cell number that is delivered for a specific indication and the follow-up can be used to determine an effective dose of cells which is related to the cellular secretomes of growth factors, extracellular vesicles, etc. The dose of MSC conglomerate mixture can be calculated back to the number of cells grown in culture, the time in culture and the conditioned media processing which can include concentration, encapsulation, etc.

C. Methods of Making the Compositions

76. As noted throughout this specification, the disclosed stem cell growth factor compositions comprise a growth factor powdered additive (including, but not limited frozen and/or lyophilized powdered additives) comprising an MSC preparation comprising MSC growth factors, extracellular vesicles and exosomes and/or MSC extracts. To prepare the powdered additive, MSCs (for example, human MSCs, animal MSCs, multipotential stromal cells, fibroblasts, and/or fibroblast cells) are cultured under standard hyperoxyic culturing conditions or artificial wound healing hypoxic conditions, which can be used to stimulate the MSCs to selectively secrete desired anti-inflammatory proteins, growth factors, peptides, cytokines, chemokines, glycosaminoglycans, proteoglycans, exosomes, and secretomes forming a conglomerate mixture. The conglomerate mixture can then be encapsulated and frozen. Once frozen, the encapsulated conglomerate mixture can be used therapeutically or lyophilized (freeze-dried) to create a dried powder. Thus, in one aspect, disclosed herein are methods of preparing an MSC-derived powdered additive by obtaining MSCs, culturing the MSCs under standard hyperoxyic culturing conditions or artificial wound healing hypoxic conditions to stimulate the MSCs to selectively secrete anti-inflammatory proteins, growth factors, peptides, cytokines, chemokines, glycosaminoglycans, proteoglycans, exosomes, and secretomes forming a conglomerate mixture; encapsulating and then freezing the conglomerate mixture; and being used therapeutically or lyophilizing (freeze-drying) the frozen encapsulated conglomerate mixture into a powder.

77. In one aspect, it is recognized that stem cell growth factor compositions can comprise an MSC preparation comprising a growth factor additive in a state other than a powder form and could be used as an encapsulated conglomerate mixture without the lyophilizing or freeze-drying to form a powder. Thus, in one aspect, disclosed herein are methods of preparing an MSC additive for use in an MSC preparation to be a component of MSC secretome compositions, said method comprising obtaining MSCs, culturing the MSCs under standard hyperoxyic culturing conditions or artificial wound healing hypoxic conditions to stimulate the cultured MSCs to selectively secrete anti-inflammatory proteins, growth factors, peptides, cytokines, chemokines, glycosaminoglycans, extracellular matrix (ECM), proteoglycans, exosomes, and secretomes forming a conglomerate mixture; and encapsulating the conglomerate mixture. In an optional aspect, the conglomerate mixture can be frozen after encapsulation.

78. In one aspect, the MSCs that were cultured in the conditioned media can be lysed prior to encapsulation and added to the extract and/or growth factor yield. The conglomerate mixture comprising the lysed MSCs can be referred to as an extracted lysate which can then be used as is or concentrated prior to encapsulation. Lysing the MSCs may be achieved by the addition of a hypotonic solution or repeated freeze-thaw processes without a cryoprotectant to disrupt the cell membranes. Moreover, the cells may be lysed while attached to the culture surface or in suspension. The cells may also be enzymatically released and/or lysed by mechanical homogenization. Thus, in one aspect, disclosed herein are methods of preparing an MSC additive for use in an MSC preparation to be a component of a MSC secretome composition, said method comprising obtaining MSCs, culturing the MSCs under standard hyperoxyic culturing conditions or artificial wound healing hypoxic conditions to stimulate the cultured MSCs to selectively secrete anti-inflammatory proteins, growth factors, peptides, cytokines, chemokines, glycosaminoglycans, extracellular matrix (ECM), proteoglycans, exosomes, and secretomes forming a conglomerate mixture; lysing the MSCs in the conglomerate mixture; and encapsulating the conglomerate mixture. In an optional aspect, the conglomerate mixture can be frozen after encapsulation. In further optional aspect, the frozen conglomerate mixture can be lyophilized or freeze-dried to create a dry powder.

79. The MSCs used in the disclosed preparatory methods for making an MSC conglomerate mixture (including a powdered form) can be selected from any type of non-terminally differentiated cell including but not limited to Multipotential stem cell, Multipotential stromal cell, Stromal vascular cells, Pericytes, Perivascular cells, Stromal cells, Pluripotent cells, Multipotent cells, Adipose-derived fibroblast-like cells, Adipose-derived stromal vascular fraction, Adipose-derived MSC, Bone Marrow-derived fibroblast-like cells, Bone Marrow-derived stromal vascular fraction, Bone Marrow-derived MSC, Tissue-derived fibroblast-like cells, Adult stem cells, Adult stromal cells, Keratinocytes, and/or Melanocytes. As noted throughout this disclosure, such cells can be obtained from the placenta, umbilical cord blood, adipose tissue, bone marrow, periosteum, or amniotic fluid. The MSCs may be obtained from human or animal bone marrow aspiration, enzymatic digestions of adipose tissue, stromal vascular fraction (SVF), enzymatic digestion of bone tissue, periosteum, amnion-derived tissues, and the like. Thus, in one aspect, the disclosed methods of preparing an MSC conglomerate mixture and/or powdered conglomerate mixture comprising obtaining MSCs; wherein the MSCs are obtained by a) human or animal bone marrow aspiration, b) enzymatic digestions of adipose tissue, c) stromal vascular fraction (SVF), or d) enzymatic digestion of bone tissue, periosteum, amnion-derived tissues, and the like.

80. As noted above, the MSC conglomerate mixture or extracted lysate (i.e., conglomerate mixture containing lysed MSCs) can be encapsulated with a protective coating in an encapsulating solution. Such a solution can comprise, for example, a cryoprotectant, oligosaccharide and a protein solution. It is understood and herein contemplated that the protective coating comprised within the encapsulating solution can be engineered as a polymer. "Polymer" can refer to a relatively high molecular weight organic compound, natural or synthetic, whose structure can be represented by a repeated small unit, the monomer. Non-limiting examples of polymers include polyethylene, rubber, cellulose. Synthetic polymers are typically formed by addition or condensation polymerization of monomers. The term "copolymer" can refer to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers. The term "polymer" encompasses all forms of polymers including, but not limited to, natural polymers, synthetic polymers, homopolymers, heteropolymers or copolymers, addition polymers, etc. In one aspect, the gel matrix can comprise copolymers, block copolymers, diblock copolymers, and/or triblock copolymers.

81. In one aspect, the protective coating in the encapsulating solution can comprise a biocompatible polymer. In one aspect, biocompatible polymer can be crosslinked. Such polymers can also serve to slowly release the adipose browning agent and/or fat modulating agent into tissue. As used herein biocompatible polymers include, but are not limited to polysaccharides; hydrophilic polypeptides; poly (amino acids) such as poly-L-glutamic acid (PGS), gamma-polyglutamic acid, poly-L-aspartic acid, poly-L-serine, or poly-L-lysine; polyalkylene glycols and polyalkylene oxides such as polyethylene glycol (PEG), polypropylene glycol (PPG), and poly(ethylene oxide) (PEO); poly(oxyethylated polyol); poly(olefinic alcohol); polyvinylpyrrolidone); poly (hydroxyalkylmethacrylamide); poly(hydroxyalkylmethacrylate); poly(saccharides); poly(hydroxy acids); poly(vinyl alcohol), polyhydroxyacids such as poly(lactic acid), poly(gly colic acid), and poly(lactic acid-co-glycolic acids); polyhydroxyalkanoates such as poly3-hydroxybutyrate or poly4-hydroxybutyrate; polycaprolactones; poly(orthoesters); polyanhydrides; poly(phosphazenes); poly(lactide-co-caprolactones); polycarbonates such as tyrosine polycarbonates; polyamides (including synthetic and natural polyamides), polypeptides, and poly(amino acids); polyesteramides; polyesters; poly(dioxanones); poly(alkylene alkylates); hydrophobic polyethers; polyurethanes; polyetheresters; polyacetals; polycyanoacrylates; polyacrylates; polymethylmethacrylates; polysiloxanes; poly(oxyethylene)/poly(oxypropylene) copolymers; polyketals; polyphosphates; polyhydroxyvalerates; polyalkylene oxalates; polyalkylene succinates; poly(maleic acids), as well as copolymers thereof. Biocompatible polymers can also include polyamides, polycarbonates, polyalkylenes, polyalkylene glycols, polyalkylene oxides, polyalkylene terepthalates, polyvinyl alcohols (PVA), methacrylate PVA (m-PVA), polyvinyl ethers, polyvinyl esters, polyvinyl halides, polyvinylpyrrolidone, polyglycolides, polysiloxanes, polyurethanes and copolymers thereof, alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulphate sodium salt, poly(methyl methacrylate), poly(ethylmethacrylate), poly(butylmethacrylate), poly(isobutylmethacrylate), poly(hexlmethacrylate), poly(isodecylmethacrylate), poly(lauryl methacrylate), poly(phenyl methacrylate), poly (methyl acrylate), poly(isopropyl acrylate), poly(isobutyl acrylate), poly(octadecyl acrylate), polyethylene, polypropylene, poly(ethylene glycol), poly(ethylene oxide), poly (ethylene terephthalate), poly(vinyl alcohols), poly(vinyl acetate, poly vinyl chloride polystyrene and polyvinylpyrrolidone, derivatives thereof, linear and branched copolymers and block copolymers thereof, and blends thereof. Exemplary biodegradable polymers include polyesters, poly (ortho esters), poly(ethylene amines), poly(caprolactones), poly(hydroxybutyrates), poly(hydroxyvalerates), polyanhydrides, poly(acrylic acids), polyglycolides, poly(urethanes), polycarbonates, polyphosphate esters, polyphospliazenes, derivatives thereof, linear and branched copolymers and block copolymers thereof, and blends thereof.

82. In some embodiments the protective coating in the encapsulating solution comprises carbohydrate construction of monosaccharides as well as carbohydrate polymers such as disaccharides or polysaccharides including but not limited to non-reducing poly or disaccharides as well as any combination thereof. Examples of carbohydrates that can be used in the protective coating comprise Glucose, Aldoses (D-Allose, D-Altrose, D-Mannose, etc.), Glucopyranose, Pentahydroxyhexanal, α-D-Glucopyranosyl-D-glucose, α-D-Glucopyranosyl-dihydrate, Polymer of β-D-Glycopyranosyl units, β-D-Fructofuranosyl α-D-glucopyranoside (anhydrous/dihydrate), β-D-Galactopyranosyl-D-glucose, α-D-Glucopyranosyl-α-D-glucopyranoside (anhydrous/dihydrate), Galactose, Pentoses (Ribose, xylose, lyxose), Dextrose, Dodecacarbon monodecahydrate, Fructose, Sucrose, Lactose, Maltose, Trehalose, Agarose, D-galactosyl-β-(1-4)-anhydro-L-galactosyl, Cellulose, Polymer of β-D-Glycopyranosyl units, and Starch, as well as, Polyhydric alcohols, Polyalcohols, Alditols, Erythritol, Glycitols, Glycerol, Xylitol, and Sorbitol.

83. In some embodiments the protective coating in the encapsulating solution contains biocompatible and/or biodegradable polyesters or polyanhydrides such as poly(lactic acid), poly(glycolic acid), and poly(lactic-co-glycolic acid). The particles can contain one more of the following polyesters: homopolymers including glycolic acid units, referred to herein as "PGA", and lactic acid units, such as poly-L-lactic acid, poly-D-lactic acid, poly-D,L-lactic acid, poly-L-lactide, poly-D-lactide, and poly-D,L-lactide5 collectively referred to herein as "PLA", and caprolactone units, such as poly(e-caprolactone), collectively referred to herein as "PCL"; and copolymers including lactic acid and glycolic acid units, such as various forms of poly(lactic acid-co-glycolic acid) and poly(lactide-co-glycolide) characterized by the ratio of lactic acid: glycolic acid, collectively referred to herein as "PLGA"; and polyacrylates, and derivatives thereof. Exemplary polymers also include copolymers of polyethylene glycol (PEG) and the aforementioned polyesters, such as various forms of PLGA-PEG or PLA-PEG copolymers, collectively referred to herein as "PEGylated polymers". In certain embodiments, the PEG region can be covalently associated with polymer to yield "PEGylated polymers" by a cleavable linker. In one aspect, the polymer comprises at least 60, 65, 70, 75, 80, 85, 89, 90, 91, 92, 93, 94, 95, 96, 97, 98, or 99 percent acetal pendant groups.

84. The triblock copolymers disclosed herein and comprised within the encapsulating solution comprise a core polymer such as, example, polyethylene glycol (PEG), polyvinyl acetate, polyvinyl alcohol, polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA), cellulose derivatives, such as hydroxymethylcellulose, hydroxypropylcellulose and the like.

85. Examples of diblock copolymers that can be used in the protective coatings in the encapsulating solutions disclosed herein comprise a polymer such as, example, polyethylene glycol (PEG), polyvinyl acetate, polyvinyl alcohol (PVA), polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA).

86. As mentioned above, culturing the MSCs may occur under standard hyperoxic culturing conditions (for example, 21% oxygen) or MSCs cultured under artificial wound healing conditions (such as, for example, 0.1% to about 5% oxygen in the presence of inflammatory cytokines, angiogenic factors, and reduced glucose). As disclosed herein artificial wound healing conditions simulate growth conditions in real wounds where there is a reduction in nutrient supply and reduction of waste removal that is usually caused by a disruption in local blood circulation. This creates a harsh environment for cells until new blood vessels are created and blood circulation is restored. Accordingly, artificial wound healing conditions used to culture MSCs can include one or more of the following growth conditions reduction in glucose availability, reduction in oxygen tension, reduction in pH, and increased temperature. The combined reduced nutrient and metabolite environment (artificial wound healing) can trigger the cultured cells to produce wound healing and anti-inflammatory ECM proteins and growth factors and extracellular vesicles that are there to direct tissue healing, which can be in the form of new ECM proteins, such as collagen and glycosaminoglycans (GAGs) as well as growth factors and cytokines. Thus, it is understood and herein contemplated that by adjusting the cell growth conditions, such as cell confluency, culture media supplements, nutritional supplements, oxygen levels, length of culture in those conditions, cell passage number or combinations of those, and the like, MSCs can be stimulated to selectively secrete the desired anti-inflammatory proteins, peptides, cytokines, chemokines, glycosaminoglycans, extracellular matrix (ECM), proteoglycans, exosomes and secretomes.

87. In one aspect, it is understood and herein contemplated that the growth conditions such as temperature, oxygen tension, pH, glucose saturation, confluency, and growth surface can affect the gene expression and protein production of cells growing in culture and thereby can result in different growth factors and cytokines being produced. For example, growth surface stiffness (Young's Modulus) affects the gene expression and protein production of the cells growing on it. Adipose cells and cartilage cells are usually maintained on a softer and more elastic growth surface (~10 kPa-12 kPa), while bone cells are better grown on a stiff surface (~$10^6$-$12^6$ kPa). By adjusting the surface stiffness, it is possible to influence the secretomes of the cells and their communication signals (growth factors, exosomes, cytokines and chemokines).

88. In one aspect, the glucose availability can be reduced relative to normal control. Modified culture media to reduce glucose, but not damage the cells can be between 0 and 50% reduction in glucose, more preferably between about 5% and 40% reduction in glucose. For example, MSC artificial wound healing culture conditions can comprise glucose reduction of about 1, 2, 3, 4, 5, 6,7,8 9, 10, 11, 12,13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% such as a glucose reduction from about 5% to about 15%, from about 10% to about 20%, from about 15% to about 25%, from about 20% to about 30%, or from about 25% to about 35%.

89. In one aspect, oxygen tension can be reduced to oxygen levels to hypoxic conditions. Normal atmospheric oxygen is approximately 21% and any reduction is considered hypoxic. Thus, in one aspect, MSCs can be cultured at between 0.0% and 20.9% oxygen, from about 0.1% to about 0.5% oxygen, from about 0.1% to about 2.0%, from about 0.1% to about 5.0% oxygen, from about 0.5% to 5.0%, from about 1.0% to about 10% oxygen, about 5.0% to about 10.0% oxygen; and from about 10.0% to about 15.0% under artificial wound healing conditions. Preferably during MSC would healing culture conditions oxygen tension is between about 0.5% and 20.5% oxygen, such as, for example, 0, 0.05, 0.1, 0.2, 0.3, 0.4, 0.5, 0.6, 0.7, 0.8, 0.9, 1.0, 1.1, 1.2, 1.3,1.4, 1.5, 1.6, 1.7, 1.7, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, or 20.5% oxygen.

90. The pH can also be reduced under artificial wound healing conditions. Physiologic pH is maintained very tightly and is usually very close to a neutral pH-7.2+0.2 (7.0-7.4). However, in a wound the acidic environment can have a pH-6.2+0.2 (i.e., a pH from 6.0 to about 6.4). Thus, under artificial wound healing culture conditions, pH can be from about 6.0 to about 7.0, for example, from 6.0 to about 6.4, from about 6.2 to about 6.4, from about 6.2 to about 6.6, from about 6.4 to about 6.6, from about 6.4 to about 6.8, or from about 6.6 to about 7.0, such as 6.0, 6.1, 6.2, 6.3, 6.4, 6.5, 6.6, 6.7, 6.8, 6.9, or 7.0.

91. Under artificial wound healing culture conditions, the temperature of the culture environment may be raised to simulate temperature increases at the site of a wound. Physiologic homeostasis temperature is maintained at 37° C. (98.6° F.). A slight increase or decrease can cause significant changes to cellular metabolism. By increasing the temperature above 37° C. to any temperature up to about 40° C. (104° F.) can create an "feverous" environment. Thus, in on aspect, the artificial wound healing culture conditions for the MSCs can comprise from about 37° C. to about 39° C., from about 37° C. to about 38° C., from about 38° C. to about 39° C., from about 39° C. to about 40° C. In one aspect, the temperature of the artificial wound healing culture can be 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0° C.

92. In one aspect, it is understood and herein contemplated that during the preparation of the MSC conglomerate mixture or powdered conglomerate mixture for use in a MSC preparation, cultured media, conglomerate mixture, extract lysate, and encapsulated versions thereof can be subjected to filter-sterilization, concentrated and prior to freezing, combined with a cytoprotectant.

93. It is further understood and herein contemplated that the final conglomerate mixture (including powdered conglomerate mixture) produced by these methods can be added to various excipient carriers to allow the concentrated active MSC anti-inflammatory proteins, growth factors, exosomes and secretomes to be absorbed through a transdermal skin patch, various mucous membrane delivery systems, intravenous (IV) injection, oral supplements, pills or capsules, or through the use of eye drops, creams, lotions, or the like.

D. Methods of Treating Skin Disorders

94. In one aspect, disclosed herein are methods of treating/inhibiting/reducing an inflammatory skin disorder (such as, for example, a skin disorder caused by microbial disease, autoimmune disease, autoinflammatory disorder, and/or physical insults that are mediated by inflammation), the effects of aging (such as reduced collagen, reduced proteoglycans, reduced hydration, etc.), inflammatory symptoms caused by a skin disorder in a subject and/or increasing skin rejuvenation, skin augmentation, and/or skin restoration, the method comprising administering to the subject a therapeutically effective amount of any of the MSC secretome composition disclosed herein. In one aspect, the MSC secretome composition can be incorporated into a dietary supplement to treat conditions including wrinkling, folds, sagging, age spots, uneven pigmentation, thinning, elasticity, scarring, surface roughness, surface vessels, redness, pore size, joint arthritis, or inflammation both locally and systemic. The dietary supplement can also provide skin tissue or muscle rejuvenation, augmentation, and/or repairing, including inducing tissue growth and recovery from standard cosmetic procedures, muscle injury, muscle overexertion, and muscle recovery.

95. As noted herein, inflammatory skin disorders can be caused by any number of insults including, but not limited to a skin disorder caused by a microbial infection (i.e, microbial disease). It is understood and herein contemplated that inflammation is a mechanism of disease caused by infection ("microbial insult"). An inflammatory skin disorder caused by a microbial insult evolves from innate immune response to an infection due to a microbe such as, for example, a virus, bacterium, fungus, or parasite. Thus, the microbial injury caused by microbial virulence factors is aggravated by the host-produced inflammatory mediators that impede the clearance of invading microbes and add insult to organ's injury. It is understood and herein contemplated that the inflammation and its end stage, sepsis can result from any microbial insult elicited by known (or unknown) virulence factors and microbial antigens. Accordingly, in one aspect, disclosed herein are methods of treating an inflammatory skin disorder in a subject comprising administering to the subject any of the MSC secretome compositions disclosed herein; wherein the inflammatory skin disorder is caused by a microbial disease such as, for example, a virus, bacterium, fungus, and/or parasite.

96. In one aspect, disclosed herein are methods of treating an inflammatory skin disorder; wherein the inflammatory skin disorder is caused by a viral infection, such as, for example, an infection with a virus selected from the group consisting of Herpes Simplex virus-1, Herpes Simplex virus-2, Varicella-Zoster virus, Epstein-Barr virus, Cytomegalovirus, Human Herpes virus-6, Variola virus, Vesicular stomatitis virus, Hepatitis A virus, Hepatitis B virus, Hepatitis C virus, Hepatitis D virus, Hepatitis E virus, Rhinovirus, Coronavirus, Influenza virus A, Influenza virus B, Measles virus, Polyomavirus, Human Papilomavirus, Respiratory syncytial virus, Adenovirus, Coxsackie virus, Dengue virus, Mumps virus, Poliovirus, Rabies virus, Rous sarcoma virus, Reovirus, Yellow fever virus, Zika virus, Ebola virus, Marburg virus, Lassa fever virus, Eastern Equine Encephalitis virus, Japanese Encephalitis virus, St. Louis Encephalitis virus, Murray Valley fever virus, West Nile virus, Rift Valley fever virus, Rotavirus A, Rotavirus B, Rotavirus C, Sindbis virus, Simian Immunodeficiency virus, Human T-cell Leukemia virus type-1, Hantavirus, Rubella virus, Simian Immunodeficiency virus, Human Immunodeficiency virus type-1, and Human Immunodeficiency virus type-2.

97. Also disclosed herein are methods of treating an inflammatory skin disorder; wherein the inflammatory skin disorder is caused by a bacterial infection, wherein the bacterial infection is an infection with a bacteria selected from the group consisting of *Mycobacterium tuberculosis, Mycobacterium bovis, Mycobacterium bovis* strain BCG, BCG substrains, *Mycobacterium avium, Mycobacterium intracellular, Mycobacterium africanum, Mycobacterium kansasii, Mycobacterium marinum, Mycobacterium ulcerans, Mycobacterium avium* subspecies paratuberculosis, *Nocardia asteroides*, other *Nocardia* species, *Legionella pneumophila*, other *Legionella* species, *Bacillus anthracis, Acetinobacter baumanii, Salmonella typhi, Salmonella enterica*, other *Salmonella* species, *Shigella boydii, Shigella dysenteriae, Shigella sonnei, Shigella flexneri*, other *Shigella* species, *Yersinia pestis, Pasteurella haemolytica, Pasteurella multocida*, other *Pasteurella* species, *Actinobacillus pleuropneumoniae, Listeria monocytogenes, Listeria ivanovii, Brucella abortus*, other *Brucella* species, Cowdria *ruminantium, Borrelia burgdorferi, Bordetella avium, Bordetella pertussis, Bordetella bronchiseptica, Bordetella trematum, Bordetella hinzii, Bordetella pteri, Bordetella parapertussis, Bordetella ansorpii* other *Bordetella* species, *Burkholderia mallei, Burkholderia psuedomallei, Burkholderia cepacian, Chlamydia pneumoniae, Chlamydia trachomatis, Chlamydia psittaci, Coxiella burnetii, Rickettsial* species, *Ehrlichia* species, *Staphylococcus aureus, Staphylococcus epidermidis, Streptococcus pneumoniae, Streptococcus pyogenes, Streptococcus agalactiae, Escherichia coli, Vibrio cholerae, Campylobacter* species, Neiserria *meningitidis, Neiserria gonorrhea, Pseudomonas aeruginosa*, other *Pseudomonas* species, *Haemophilus influenzae, Haemophilus ducreyi*, other Hemophilus species, *Clostridium tetani*, other *Clostridium* species, *Yersinia* enterolitica, and other *Yersinia* species. In some instances, the bacteria causing the bacterial infection is not *Bacillus anthracis*.

98. In one aspect, disclosed herein are methods of treating an inflammatory skin disorder; wherein the inflammatory skin disorder is caused by a fungal infection, wherein the fungal infection is an infection with a fungi selected from the group consisting of *Candida albicans, Cryptococcus neoformans, Histoplama capsulatum, Aspergillus fumigatus, Coccidiodes immitis, Paracoccidioides brasiliensis, Blastomyces dermitidis, Pneumocystis carnii, Penicillium marneffi*, and *Alternaria alternata*.

99. Also disclosed herein are methods of treating an inflammatory skin disorder; wherein the inflammatory skin disorder is caused by a parasitic infection, wherein the parasitic infection is an infection with a parasite selected from the group consisting of *Toxoplasma gondii, Plasmodium falciparum, Plasmodium vivax, Plasmodium malariae*, other *Plasmodium* species, *Entamoeba histolytica, Naegleria fowleri, Rhinosporidium seeberi, Giardia lamblia, Enterobius vermicularis, Enterobius gregorii, Ascaris lumbricoides, Ancylostoma duodenale, Necator americanus, Cryptosporidium* spp., *Trypanosoma brucei, Trypanosoma cruzi, Leishmania major*, other *Leishmania* species, *Diphyllobothrium latum, Hymenolepis nana, Hymenolepis diminuta, Echinococcus granulosus, Echinococcus multilocularis, Echinococcus vogeli, Echinococcus oligarthrus, Diphyllobothrium latum, Clonorchis sinensis; Clonorchis viverrini, Fasciola hepatica, Fasciola gigantica, Dicrocoe-*

*lium dendriticum, Fasciolopsis buski, Metagonimus yokogawai, Opisthorchis viverrini, Opisthorchis felineus, Clonorchis sinensis, Trichomonas vaginalis, Acanthamoeba species, Schistosoma intercalatum, Schistosoma haematobium, Schistosoma japonicum, Schistosoma mansoni,* other *Schistosoma* species, *Trichobilharzia regenti, Trichinella spiralis, Trichinella britovi, Trichinella nelsoni, Trichinella nativa,* and *Entamoeba histolytica.*

100. In some aspect, the skin disorder is due to age. The MSC-derived composition described can direct dermal fibroblasts to create new collagen and hydrophilic proteoglycans to create a healthy extracellular matrix, which is highly hydrated and supports the epidermal layer. The collagenase inhibitors present in the MSC composition will prevent further dermis extracellular matrix breakdown. Thus, in one aspect, disclosed herein are methods of restoring, rejuvenating, augmenting, or improving skin of a subject comprising administering to the subject any of the MSC secretome compositions disclosed herein. This can be accomplished by combining MSC secretome compositions with excipient carriers that are able to penetrate the epidermis or by injections into the dermis.

E. Methods of Treating Autoimmune Diseases

101. As noted above, the MSC secretome compositions disclosed herein can provide, MSCs, MSC derived growth factors, MSC extracts, and/or MSC lysates that have many anti-inflammatory properties and therefore have the ability to reduce systemic inflammation. As noted throughout this specification, MSCs secrete an array of growth factors, extracellular vesicles, exosomes and anti-inflammatory proteins with complex feedback mechanisms among the many types of immune cells. The key immunomodulatory cytokines include prostaglandin E2 (PGE2), transforming growth factor β1 (TGF-β1), hepatocyte growth factor (HGF), stromal cell derived factor-1 (SDF-1), nitric oxide, indoleamine 2,3-dioxygenase, interleukin-4 (IL-4), IL-6, interleukin-10 (IL-10), IL-1 receptor antagonist and soluble TNF-α receptor. Thus, the novel stem cell growth factor compositions disclosed herein can inhibit, reduce, and/or arrest inflammation-driven destruction associated with diseases including autoimmune diseases. As used herein, "autoimmune disease" refers to a set of diseases, disorders, or conditions resulting from an adaptive immune response (T cell and/or B cell response) against the host organism. In such conditions, either by way of mutation or other underlying cause, the host T cells and/or B cells and/or antibodies are no longer able to distinguish host cells from non-self-antigens and attack host cells baring an antigen for which they are specific. Examples of autoimmune diseases that can cause an inflammatory disorder include, but are not limited to Achalasia, Acute disseminated encephalomyelitis, Acute motor axonal neuropathy, Addison's disease, Adiposis dolorosa, Adult Still's disease, Agammaglobulinemia, Alopecia areata, Alzheimer's disease, Amyloidosis, Ankylosing spondylitis, Anti-GBM/Anti-TBM nephritis, Antiphospholipid syndrome, Aplastic anemia, Autoimmune angioedema, Autoimmune dysautonomia, Autoimmune encephalomyelitis, Autoimmune enteropathy, Autoimmune hemolytic anemia, Autoimmune hepatitis, Autoimmune inner ear disease (AIED), Autoimmune myocarditis, Autoimmune oophoritis, Autoimmune orchitis, Autoimmune pancreatitis, Autoimmune polyendocrine syndrome, Autoimmune retinopathy, Autoimmune urticaria, Axonal & neuronal neuropathy (AMAN), Baló disease, Behcet's disease, Benign mucosal emphigoid, Bickerstaff's encephalitis, Bullous pemphigoid, Castleman disease (CD), Celiac disease, Chagas disease, Chronic fatigue syndrome, Chronic inflammatory demyelinating polyneuropathy (CIDP), Chronic recurrent multifocal osteomyelitis (CRMO), Churg-Strauss Syndrome (CSS), Eosinophilic Granulomatosis (EGPA), Cicatricial pemphigoid, Cogan's syndrome, Cold agglutinin disease, Congenital heart block, Coxsackie myocarditis, CREST syndrome, Crohn's disease, Dermatitis herpetiformis, Dermatomyositis, Devic's disease (neuromyelitis optica), Diabetes mellitus type 1, Discoid lupus, Dressler's syndrome, Endometriosis, Enthesitis, Eosinophilic esophagitis (EoE), Eosinophilic fasciitis, Erythema nodosum, Essential mixed cryoglobulinemia, Evans syndrome, Felty syndrome, Fibromyalgia, Fibrosing alveolitis, Giant cell arteritis (temporal arteritis), Giant cell myocarditis, Glomerulonephritis, Goodpasture's syndrome, Granulomatosis with Polyangiitis, Graves' disease, Guillain-Barre syndrome, Hashimoto's encephalopathy, Hashimoto's thyroiditis, Hemolytic anemia, Henoch-Schonlein purpura (HSP), Herpes gestationis or pemphigoid gestationis (PG), Hidradenitis Suppurativa (HS) (Acne Inversa), Hypogammalglobulinemia, IgA Nephropathy, IgG4-related sclerosing disease, Immune thrombocytopenia purpura (ITP), Inclusion body myositis (IBM), Interstitial cystitis (IC), Inflammatory Bowel Disease (IBD), Juvenile arthritis, Juvenile diabetes (Type 1 diabetes), Juvenile myositis (JM), Kawasaki disease, Lambert-Eaton syndrome, Leukocytoclastic vasculitis, Lichen planus, Lichen sclerosus, Ligneous conjunctivitis, Linear IgA disease (LAD), Lupus nephritis, Lupus vasculitis, Lyme disease chronic, Meniere's disease, Microscopic polyangiitis (MPA), Mixed connective tissue disease (MCTD), Mooren's ulcer, Mucha-Habermann disease, Multifocal Motor Neuropathy (MMN) or MMNCB, Multiple sclerosis, Myasthenia gravis, Myositis, Narcolepsy, Neonatal Lupus, Neuromyelitis optica, Neutropenia, Ocular cicatricial pemphigoid, Optic neuritis, Ord's thyroiditis, Palindromic rheumatism (PR), PANDAS, Paraneoplastic cerebellar degeneration (PCD), Paroxysmal nocturnal hemoglobinuria (PNH), Parry Romberg syndrome, Pars planitis (peripheral uveitis), Parsonnage-Turner syndrome, Pemphigus, Peripheral neuropathy, Perivenous encephalomyelitis, Pernicious anemia (PA), POEMS syndrome, Polyarteritis nodosa, Polyglandular syndromes type I, II, III, Polymyalgia rheumatica, Polymyositis, Postmyocardial infarction syndrome, Postpericardiotomy syndrome, Primary biliary cirrhosis, Primary sclerosing cholangitis, Progesterone dermatitis, Psoriasis, Psoriatic arthritis, Pure red cell aplasia (PRCA), Pyoderma gangrenosum, Raynaud's phenomenon, Reactive Arthritis, Reflex sympathetic dystrophy, Relapsing polychondritis, Restless legs syndrome (RLS), Retroperitoneal fibrosis, Rheumatic fever, Rheumatoid arthritis, Rheumatoid vasculitis, Sarcoidosis, Schmidt syndrome, Schnitzler syndrome, Scleritis, Scleroderma, Sjögren's syndrome, Sperm & testicular autoimmunity, Stiff person syndrome (SPS), Subacute bacterial endocarditis (SBE), Susac's syndrome, Sydenham chorea, Sympathetic ophthalmia (SO), Systemic Lupus Erythematosus, Systemic scleroderma, Takayasu's arteritis, Temporal arteritis/Giant cell arteritis, Thrombocytopenia purpura (TTP), Tolosa-Hunt syndrome (THS), Transverse myelitis, Type 1 diabetes, Ulcerative colitis (UC), Undifferentiated connective tissue disease (UCTD), Urticaria, Urticarial vasculitis, Uveitis, Vasculitis, Vitiligo, Vogt-Koyanagi-Harada Disease, and Wegener's granulomatosis (or Granulomatosis with Polyangiitis (GPA)). In one aspect, disclosed herein are methods of treating autoimmune diseases or inflammatory symptoms associated with an autoimmune disease (such as, for example an inflammatory disorder or wound caused by an autoimmune disease) comprising administering to a subject with an autoimmune disease a therapeutically effective amount of any of the MSC secretome compositions disclosed herein.

F. Methods of Treating Autoinflammatory Disorders

102. The MSC secretome compositions disclosed herein are not limited in treatment of inflammation resulting from adaptive immune responses but are also effective in arresting inflammation-driven destruction associated innate immune responses (ie., immune responses associated with NK cells and macrophages). As used herein "autoinflammatory disorders refer to disorders where the innate immune response attacks host cells. Examples of autoinflammatory disorders include asthma, graft versus host disease (GvHD), allergy, transplant rejection, Familial Cold Autoinflammatory Syndrome (FCAS), Muckle-Wells Syndrome (MWS), Neonatal-Onset Multisystem Inflammatory Disease (NOMID) (also known as Chronic Infantile Neurological Cutaneous Articular Syndrome (CINCA)), Familial Mediterranean Fever (FMF), Tumor Necrosis Factor (TNF)-Associated Periodic Syndrome (TRAPS), TNFRSF11A-associated hereditary fever disease (TRAPS11), Hyperimmunoglobulinemia D with Periodic Fever Syndrome (HIDS), Mevalonate Aciduria (MA), Mevalonate Kinase Deficiencies (MKD), Deficiency of Interleukin-1ß (IL-1ß) Receptor Antagonist (DIRA) (also known as Osteomyelitis, Sterile Multifocal with Periostitis Pustulosis), Majeed Syndrome, Chronic Nonbacterial Osteomyelitis (CNO), Early-Onset Inflammatory Bowel Disease, Diverticulitis, Deficiency of Interleukin-36-Receptor Antagonist (DITRA), Familial Psoriasis (PSORS2), Pustular Psoriasis, Pyogenic Sterile Arthritis, Pyoderma Gangrenosum, and Acne Syndrome (PAPA), Congenital sideroblastic anemia with immunodeficiency, fevers, and developmental delay (SIFD), Pediatric Granulomatous Arthritis (PGA), Familial Behçets-like Autoinflammatory Syndrome, NLRP12-Associated Periodic Fever Syndrome, Proteasome-associated Autoinflammatory Syndromes (PRAAS), Spondyloenchondrodysplasia with immune dysregulation (SPENCDI), STING-associated vasculopathy with onset in infancy (SAVI), Aicardi-Goutieres syndrome, Acute Febrile Neutrophilic Dermatosis, X-linked familial hemophagocytic lymphohistiocytosis, and Lyn kinase-associated Autoinflammatory Disease (LAID). Accordingly, in one aspect, disclosed herein are methods of treating an autoinflammatory disorder or inflammatory symptoms associated with an autoinflammatory disorder (such as, for example an inflammatory skin disorder or wound caused by an autoinflammatory disorder) comprising administering to a subject with an autoinflammatory disease a therapeutically effective amount of any of the MSC secretome compositions disclosed herein.

G. Methods of Treating Physical Insults

103. The methods disclosed herein involve treating skin diseases and disorders (including, but not limited to wounds and/or inflammatory skin disorders or symptoms from other inflammatory insults on the skin). Many inflammatory conditions result from physical injuries mediated by inflammation (such as, for example myocardial infarction, abrasion, puncture, laceration, contusion, blunt force trauma, ischemia, ulcers, hemorrhagic stroke, surgery, transplant, spinal pathologies, joint or trauma repair, fractures, sunburn, chemical burn, high temperature burn, low temperature burn). As noted above, the MSC secretome compositions disclosed herein provide functional mesenchymal stem cell (MSC) derived anti-inflammatory proteins, peptides, cytokines, chemokines, proteoglycans, glycosaminoglycans, secretomes, and exosomes for stimulating wound repair and decreasing inflammation. Accordingly, in one aspect, disclosed herein are methods of treating inflammation and/or repairing a wound caused by physical injury (such as, for example myocardial infarction, abrasion, puncture, laceration, contusion, blunt force trauma, ischemia, hemorrhagic stroke, surgery, transplant, sunburn, chemical burn, high temperature burn, low temperature burn) comprising administering to a subject with a physical injury a therapeutically effective amount of any of the MSC secretome compositions disclosed herein.

104. It is further understood, that by treating a wound with a therapeutically effective amount of any of the MSC secretome compositions disclosed herein not only will the wound be treated, but the time needed for the healing process can be reduced compared to untreated wounds. Thus, disclosed herein are methods of reducing the healing time of a wound comprising contacting the wound with a therapeutically effective amount of a composition comprising the MSC secretome compositions disclosed herein.

105. It is understood and herein contemplated that many inflammatory conditions treatments will involve the treatment of a wound. Thus, in one aspect, disclosed herein are methods of treating a wound comprising contacting the wound with a therapeutically effective amount of any of the MSC secretome compositions disclosed herein. As noted throughout this specification, the MSC secretome compositions can be applied to or manufactured as a component of adhesive bandages, sponges, stents, scaffolds, matrixes, wound dressings, grafts, surgical drapes, sutures, salves, creams, or wound adhesives. Thus, in one aspect, disclosed herein are methods of treating a wound comprising contacting the wound with adhesive bandages, wound dressings, grafts, surgical drapes, sutures, salves, creams, or wound adhesives comprising a therapeutically effective amount of a MSC secretome compositions. In some aspect, the MSC secretome compositions can be applied to a thin film polymer sheet or resorbable poly-lactic acid film and then used to treat the wound.

H. a Method of Treating Sexual Dysfunction

106. It is understood that one complication associated with many inflammatory diseases including autoimmune diseases (such as, for example, diabetes, Parkinson's disease, Multiple sclerosis), metabolic disease, as well as inflammation due to heart disease, high blood pressure, high cholesterol, stress, depression, and some medications can be the complication of sexual arousal dysfunction (such as, for example, reduced vaginal swelling during arousal and erectile dysfunction). Thus, in one aspect, by treating the underlying inflammatory disease or inflammation, the sexual dysfunction can be treated. Additionally, in the same way that MSCs are used to make an MSC conglomerate mixture (ultimately for use as a MSC preparation that can be used in the disclosed stem cell growth factor compositions) can be stimulated to selectively secrete mesenchymal stem cell proteins, peptides, glycosaminoglycans, extracellular matrix (ECM), proteoglycans, secretomes, chemokines, cytokines, and exosomes; stimulation can also be used to selectively secrete mesenchymal stem cell proteins, peptides, glycosaminoglycans, extracellular matrix (ECM), proteoglycans, secretomes, chemokines, cytokines, and exosomes that can assist in treating sexual dysfunction. Thus, in one aspect, disclosed herein are methods of treating sexual dysfunction (such as, for example, reduced vaginal swelling during arousal and erectile dysfunction) in a subject comprising administering to the subject a therapeutically effective amount of any of the MSC secretome compositions disclosed herein.

I. Methods of Treating Pain

107. Pain is an important symptom that serves as a warning sign of a pathological condition and is also a key diagnostic criterion for several acute and chronic medical conditions. Nociception, or pain perception, can involve the integration of different types of transduction/conduction mechanisms and chemical mediators, depending on the nature and site of injury. Nociceptors are not uniformly sensitive to all types of injury signals; some are specific for mechanical, thermal, and toxic chemical or inflammatory mediators.

108. Recently, the relationship between proinflammatory biomarkers and pain has been examined in populations of patients with painful conditions in which inflammation is a key pathological feature of the disease process. Chronic systemic inflammation has been implicated as a factor in an array of conditions associated with pain, neurologic disorders and autoimmune diseases. For example, cytokines produced by macrophages and monocytes at the site of inflammation play a key role in atherogenesis and coronary heart disease. Proinflammatory biomarkers, such as cytokines, have been found in both chronic and acute pain states, suggesting either a direct or facilitator role in the occurrence of pain. Because cytokines reflect the pathophysiological process of inflammation, they may be potential candidate biomarkers of disorders in conditions linked to inflammation, particularly when pain, neurologic disorders or autoimmune diseases are absent or attenuated.

109. Multiple cytokines are produced during an inflammatory reaction. Cytokines contribute to inflammatory processes by activation of specific signal transduction mechanisms as well as the activation of other cell types. Cytokines are found extracellularly (in blood) and in interstitial compartments, where they can activate cells in an autocrine/paracrine fashion. It has been postulated that increased levels of cytokines influence and contribute to the sensation of neurologic pain by increasing the sensitization of nociceptors. When tissue is invaded or destroyed by leukocytes during an inflammatory episode, several mediators such as interleukin-1 (IL-1), interleukin-6 (IL-6), and tumor necrosis factor alpha (TNF-$\alpha$) migrate to the site. Also included in these mediators are nerve growth factor and prostaglandins, which can be considered proalgesic, or pain causing.

110. After tissue injury, cytokines and chemokines are released in the local environment of nerve endings, where they contribute to activation of pain nociceptors and potentially contribute to the development of hyperalgesia. Hyperalgesia occurs when a low-intensity stimulus that is typically not associated with pain becomes a painful stimulus.

111. At the same time, some analgesic mediators are also released, which are produced in the inflamed tissue. These include anti-inflammatory cytokines and opioid peptides. MSCs have many anti-inflammatory properties. In many types of musculoskeletal trauma, inflammatory conditions at the site of injury or in a disease state impede the natural repair processes by local progenitor and mature cells. MSCs assist via paracrine mechanisms and modulate the regenerative environment via anti-inflammatory and immunomodulatory mechanisms. In response to inflammatory molecules such as IL-1, interleukin-2 (IL-2), interleukin-12 (IL-12), TNF-$\alpha$, prostaglandin E2 (PGE2), and interferon-gamma (INF-$\gamma$), MSCs secrete an array of growth factors and anti-inflammatory proteins with complex feedback mechanisms among the many types of immune cells. The key immunomodulatory cytokines include prostaglandin E2 (PGE2), transforming growth factor $\beta$1 (TGF-$\beta$1), hepatocyte growth factor (HGF), stromal cell derived factor-1 (SDF-1), nitric oxide, indoleamine 2,3-dioxygenase, interleukin-4 (IL-4), IL-6, interleukin-10 (IL-10), IL-1 receptor antagonist and soluble TNF-$\alpha$ receptor. MSCs prevent proliferation and function of many inflammatory immune cells, including T cells, natural killer cells, B cells, monocytes, macrophages and dendritic cells. Although MSCs across species are able to regulate T cell activity, the mechanisms are not identical across mammalian species.

112. A characteristic of chronically inflamed environments is a persistent imbalance in the types of helper T cells and macrophages. MSCs indirectly maintain T cells as Treg cells and promote the transition of TH1 to TH2 cells by reducing INF-y and increasing IL-4 and IL-10. The restored TH1/TH2 balance has been shown to improve tissue regeneration in cartilage, muscle and other soft tissue injuries, alleviate symptoms of autoimmune diseases and have an anti-diabetic effect. Similarly, reduction in INF-y and secretion of IL-4 promotes a shift in macrophages from M1 (pro-inflammatory, anti-angiogenic and tissue growth inhibition) to M2 (anti-inflammatory, pro-remodeling and tissue healing) type, an effect required for skeletal, muscular and neural healing and regeneration.

113. Undifferentiated MSCs express low to medium levels of human leukocyte antigen (HLA) Class I and low levels of HLA Class II to avoid recognition by the immune system. This property gives donor MSCs a so-called 'stealth' ability to go undetected by a host immune system in allogeneic therapies. However, Class I antigen is present at detectable levels and Class II antigen expression can be induced by INF-y. Several cases of allogeneic MSC rejection and chronic immune responses have been reported in animal studies and human clinical trials. This entire problem can be avoided by the use of the mesenchymal stem cell proteins, peptides, glycosaminoglycans, extracellular matrix (ECM), proteoglycans, secretomes, chemokines, cytokines, and exosomes collected from conditioned growth media. Therefore, in one aspect, disclosed herein are methods of treating, inhibiting, or reducing inflammation (including nociception) associated with an injury or inflammation due to infection, autoimmune disease, autoinflammatory disease, or skin disorder event comprising administering to a subject with an autoinflammatory disease a therapeutically effective amount of any of the MSC secretome compositions disclosed herein.

What is claimed is:

1. A pharmaceutical acellular composition for human administration, wherein the pharmaceutical acellular composition comprises:

a therapeutically effective amount of a human bone marrow mesenchymal stem cell (MSC) secretome comprising epidermal growth factor (EGF), bone morphogenetic protein 1 (BMP-1), hepatocyte growth factor (HGF), vascular endothelial growth factor (VEGF), and interleukin-6 (IL-6), wherein the therapeutically effective amount is sufficient to reduce inflammation in the human, wherein the pharmaceutical acellular composition is in a powdered form.

2. The pharmaceutical acellular composition of claim 1, wherein the bone marrow MSC secretome is secreted and separated from the human bone marrow MSC.

3. A pharmaceutical solution comprising the pharmaceutical acellular composition of claim 1 and saline.

4. The pharmaceutical acellular composition of claim 1, wherein 0.01% to 10% by weight of the pharmaceutical acellular composition is the bone marrow MSC secretome.

5. The pharmaceutical acellular composition of claim 1, wherein the bone marrow MSC secretome comprises extracellular vesicles having a size of 35 nm to 200 nm.

6. The pharmaceutical acellular composition of claim 5, wherein the extracellular vesicles are 50 nm to 150 nm in size.

7. The pharmaceutical solution of claim 3, wherein the pharmaceutical solution is a frozen liquid.

8. The pharmaceutical acellular composition of claim 1, wherein the pharmaceutical acellular composition comprises sucrose, D-mannose, lactose, trehalose, or glucose, or a combination of two or more thereof.

9. The pharmaceutical acellular composition of claim 1, wherein the pharmaceutical acellular composition is sterilized.

10. The pharmaceutical acellular composition of claim 1, wherein the bone marrow MSC secretome further comprises insulin-like growth factor (IGF).

* * * * *